United States Patent
Liu et al.

(10) Patent No.: US 11,582,715 B2
(45) Date of Patent: Feb. 14, 2023

(54) RADIO (NR) MULTICAST FEEDBACK SWITCHING

(71) Applicant: QUALCOMM INCORPORATED, San Diego, CA (US)

(72) Inventors: Le Liu, Fremont, CA (US); Peter Gaal, San Diego, CA (US); Ayan Sengupta, San Diego, CA (US); Alberto Rico Alvarino, San Diego, CA (US); Kazuki Takeda, Tokyo (JP); Xiaoxia Zhang, San Diego, CA (US); Tao Luo, San Diego, CA (US); Wanshi Chen, San Diego, CA (US); Prasad Reddy Kadiri, San Diego, CA (US); Mostafa Khoshnevisan, San Diego, CA (US); Umesh Phuyal, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 17/172,485

(22) Filed: Feb. 10, 2021

(65) Prior Publication Data
US 2021/0250905 A1   Aug. 12, 2021

Related U.S. Application Data

(60) Provisional application No. 62/975,436, filed on Feb. 12, 2020.

(51) Int. Cl.
*H04W 72/00* (2009.01)
*H04L 5/00* (2006.01)
(Continued)

(52) U.S. Cl.
CPC ........ *H04W 72/005* (2013.01); *H04L 5/0055* (2013.01); *H04L 5/0094* (2013.01); *H04W 72/1289* (2013.01); *H04W 72/14* (2013.01)

(58) Field of Classification Search
CPC ... H04L 1/0026; H04L 1/1861; H04L 1/1896; H04L 2001/0093; H04L 5/0055;
(Continued)

(56) References Cited

U.S. PATENT DOCUMENTS

2004/0085933 A1* 5/2004 Wang .................... H01Q 1/288
370/334
2004/0253968 A1* 12/2004 Chang .................. H04L 25/067
455/135

(Continued)

FOREIGN PATENT DOCUMENTS

WO        2018056108 A1    3/2018

OTHER PUBLICATIONS

International Search Report and Written Opinion—PCT/US2021/017734—ISA/EPO—dated Jun. 8, 2021.
(Continued)

*Primary Examiner* — Hassan A Phillips
*Assistant Examiner* — Hicham B Foud
(74) *Attorney, Agent, or Firm* — Haynes and Boone, LLP

(57) ABSTRACT

Wireless communications systems and methods related to acknowledgement/negative-acknowledgement (ACK/NACK) feedback operations for multicast communications are provided. A first user equipment (UE) receives, from a base station (BS), a multicast feedback configuration indicating a first resource configuration for a negative-acknowledgement (NACK) feedback mode; and a second resource configuration for an acknowledgement/negative-acknowledgement (ACK/NACK) feedback mode. The first UE receives, from the BS, a first multicast communication. The
(Continued)

first UE transmits, to the BS, a NACK feedback for the first multicast communication based on the first resource configuration. The first UE receives, from the BS, a second multicast communication. The first UE transmits, to the BS, an ACK feedback or a NACK feedback for the second multicast communication based on the second resource configuration.

29 Claims, 10 Drawing Sheets

(51) Int. Cl.
*H04W 72/14* (2009.01)
*H04W 72/12* (2009.01)

(58) Field of Classification Search
CPC ... H04L 5/0094; H04L 1/1864; H04L 1/1893; H04W 4/06; H04W 72/005; H04W 72/1289; H04W 72/14
See application file for complete search history.

(56) References Cited

U.S. PATENT DOCUMENTS

| | | | |
|---|---|---|---|
| 2007/0097927 A1* | 5/2007 | Gorokhov | H04B 1/7103 370/335 |
| 2008/0049749 A1 | 2/2008 | Xiao et al. | |
| 2008/0310338 A1* | 12/2008 | Charpenter | H04L 1/1671 370/315 |
| 2016/0226627 A1* | 8/2016 | Nabetani | H04W 4/70 |
| 2018/0279274 A1* | 9/2018 | Sun | H04L 1/1864 |
| 2019/0123923 A1* | 4/2019 | Belleschi | H04L 1/08 |
| 2019/0327061 A1* | 10/2019 | Li | H04L 1/0057 |
| 2020/0204329 A1* | 6/2020 | Fujishiro | H04W 56/0045 |
| 2020/0351032 A1* | 11/2020 | Wu | H04W 72/10 |
| 2021/0250905 A1* | 8/2021 | Liu | H04L 5/0094 |
| 2022/0006571 A1* | 1/2022 | Basu Mallick | H04L 1/1835 |
| 2022/0150908 A1* | 5/2022 | Ji | H04W 72/1205 |

OTHER PUBLICATIONS

LG Electronics: "Discussion on UE Feedback for DL Multicast/Broadcast", 3GPP Draft, 3GPP TSG RAN WG1 Meeting #85, R1-164537 Feedback for DL Broadcast, 3rd Generation Partnership Project (3GPP), Mobile Competence Centre, 650, Route Des Lucioles, F-06921, Sophia-Antipolis Cedex, France, vol. RAN WG1, No. Nanjing, China, May 23, 2016-May 27, 2016, May 14, 2016 (May 14, 2016), XP051096398, pp. 1-5, Retrieved from the Internet: URL: http://www.3gpp.org/ftp/tsg_ran/WG1_RL1/TSGR1_85/Docs/ [retrieved on May 14, 2016] pp. 1-2, section 2.

\* cited by examiner

RADIO (NR) MULTICAST FEEDBACK SWITCHING

CROSS REFERENCE TO RELATED APPLICATIONS

The present application claims priority to and the benefit of U.S. Provisional Patent Application No. 62/975,436, filed Feb. 12, 2020, which is hereby incorporated by reference in its entirety as if fully set forth below and for all applicable purposes.

TECHNICAL FIELD

This application relates to wireless communication systems, and more particularly to acknowledgement/negative-acknowledgement (ACK/NACK) feedback operations for multicast communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

A wireless communication network may support broadcast, multicast, and/or unicast services. A broadcast service is a service that may be received by all users. A multicast service is a service that may be received by a group of users, for example, based on subscriptions. A unicast service is a service intended for a specific user, for example, voice calls. In general, a network may communicate with a group of uses using unicast, broadcast, multicast or a combination thereof. However, as the group becomes larger (e.g., a greater number of users), it may be more efficient to use multicast services.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, including receiving, by a first user equipment (UE) from a base station (BS), a multicast feedback configuration indicating a first resource configuration for a negative-acknowledgement (NACK) feedback mode; and a second resource configuration for an acknowledgement/negative-acknowledgement (ACK/NACK) feedback mode; receiving, by the first UE from the BS, a first multicast communication; transmitting, by the first UE to the BS, a NACK feedback for the first multicast communication based on the first resource configuration; receiving, by the first UE from the BS, a second multicast communication; and transmitting, by the first UE to the BS, an ACK feedback or a NACK feedback for the second multicast communication based on the second resource configuration.

In an additional aspect of the disclosure, a method of wireless communication, including transmitting, by a base station (BS), a multicast feedback configuration indicating a first resource configuration for a negative-acknowledgement (NACK) feedback mode; and a second resource configuration for an acknowledgement/negative-acknowledgement (ACK/NACK) feedback mode; transmitting, by the BS to a group of user equipments (UEs), a first multicast communication; receiving, by the BS from one or more UEs of the group of UEs, a NACK feedback for the first multicast communication based on the first resource configuration; transmitting, by the BS to the group of UEs, a second multicast communication; and receiving, by the BS from a first UE of the one or more UEs, an ACK feedback or a NACK feedback for the second multicast communication based on the second resource configuration.

In an additional aspect of the disclosure, a user equipment (UE), including means for receiving, from a base station (BS), a multicast feedback configuration indicating a first resource configuration for a negative-acknowledgement (NACK) feedback mode; and a second resource configuration for an acknowledgement/negative-acknowledgement (ACK/NACK) feedback mode; receiving, from the BS, a first multicast communication; means for transmitting, to the BS, a NACK feedback for the first multicast communication based on the first resource configuration; means for receiving, from the BS, a second multicast communication; and means for transmitting, to the BS, an ACK feedback or a NACK feedback for the second multicast communication based on the second resource configuration.

In an additional aspect of the disclosure, a base station (BS), including means for transmitting a multicast feedback configuration indicating a first resource configuration for a negative-acknowledgement (NACK) feedback mode; and a second resource configuration for an acknowledgement/negative-acknowledgement (ACK/NACK) feedback mode; means for transmitting, to a group of user equipments (UEs), a first multicast communication; means for receiving, from one or more UEs of the group of UEs, a NACK feedback for the first multicast communication based on the first resource configuration; means for transmitting, to the group of UEs, a second multicast communication; and means for receiving, from a first UE of the one or more UEs, an ACK feedback or a NACK feedback for the second multicast communication based on the second resource configuration.

In an additional aspect of the disclosure, a non-transitory computer-readable medium having program code recorded thereon, the program code including code for causing a user equipment (UE) to receive, from a base station (BS), a multicast feedback configuration indicating a first resource configuration for a negative-acknowledgement (NACK) feedback mode; and a second resource configuration for an acknowledgement/negative-acknowledgement (ACK/NACK) feedback mode; code for causing the UE to receive, from the BS, a first multicast communication; code for causing the UE to transmit, to the BS, a NACK feedback for the first multicast communication based on the first resource configuration; code for causing the UE to receive, from the BS, a second multicast communication; and code for causing the UE to transmit, to the BS, an ACK feedback or a NACK feedback for the second multicast communication based on the second resource configuration.

In an additional aspect of the disclosure, a non-transitory computer-readable medium having program code recorded thereon, the program code including code for causing a base station (BS) to transmit a multicast feedback configuration indicating a first resource configuration for a negative-acknowledgement (NACK) feedback mode; and a second resource configuration for an acknowledgement/negative-acknowledgement (ACK/NACK) feedback mode; code for causing the BS to transmit, to a group of user equipments (UEs), a first multicast communication; code for causing the BS to receive, from one or more UEs of the group of UEs, a NACK feedback for the first multicast communication based on the first resource configuration; code for causing the BS to transmit, to the group of UEs, a second multicast communication; and code for causing the BS to receive, from a first UE of the one or more UEs, an ACK feedback or a NACK feedback for the second multicast communication based on the second resource configuration.

In an additional aspect of the disclosure, a user equipment (UE), including a transceiver configured to receive, from a base station (BS), a multicast feedback configuration indicating a first resource configuration for a negative-acknowledgement (NACK) feedback mode; and a second resource configuration for an acknowledgement/negative-acknowledgement (ACK/NACK) feedback mode; receive, from the BS, a first multicast communication; transmit, to the BS, a NACK feedback for the first multicast communication based on the first resource configuration; receive, from the BS, a second multicast communication; and transmit, to the BS, an ACK feedback or a NACK feedback for the second multicast communication based on the second resource configuration.

In an additional aspect of the disclosure, a base station (BS), including a transceiver configured to transmit a multicast feedback configuration indicating a first resource configuration for a negative-acknowledgement (NACK) feedback mode; and a second resource configuration for an acknowledgement/negative-acknowledgement (ACK/NACK) feedback mode; transmit, to a group of user equipments (UEs), a first multicast communication; receive, from one or more UEs of the group of UEs, a NACK feedback for the first multicast communication based on the first resource configuration; transmit, to the group of UEs, a second multicast communication; and receive, from a first UE of the one or more UEs, an ACK feedback or a NACK feedback for the second multicast communication based on the second resource configuration.

Other aspects, features, and embodiments of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
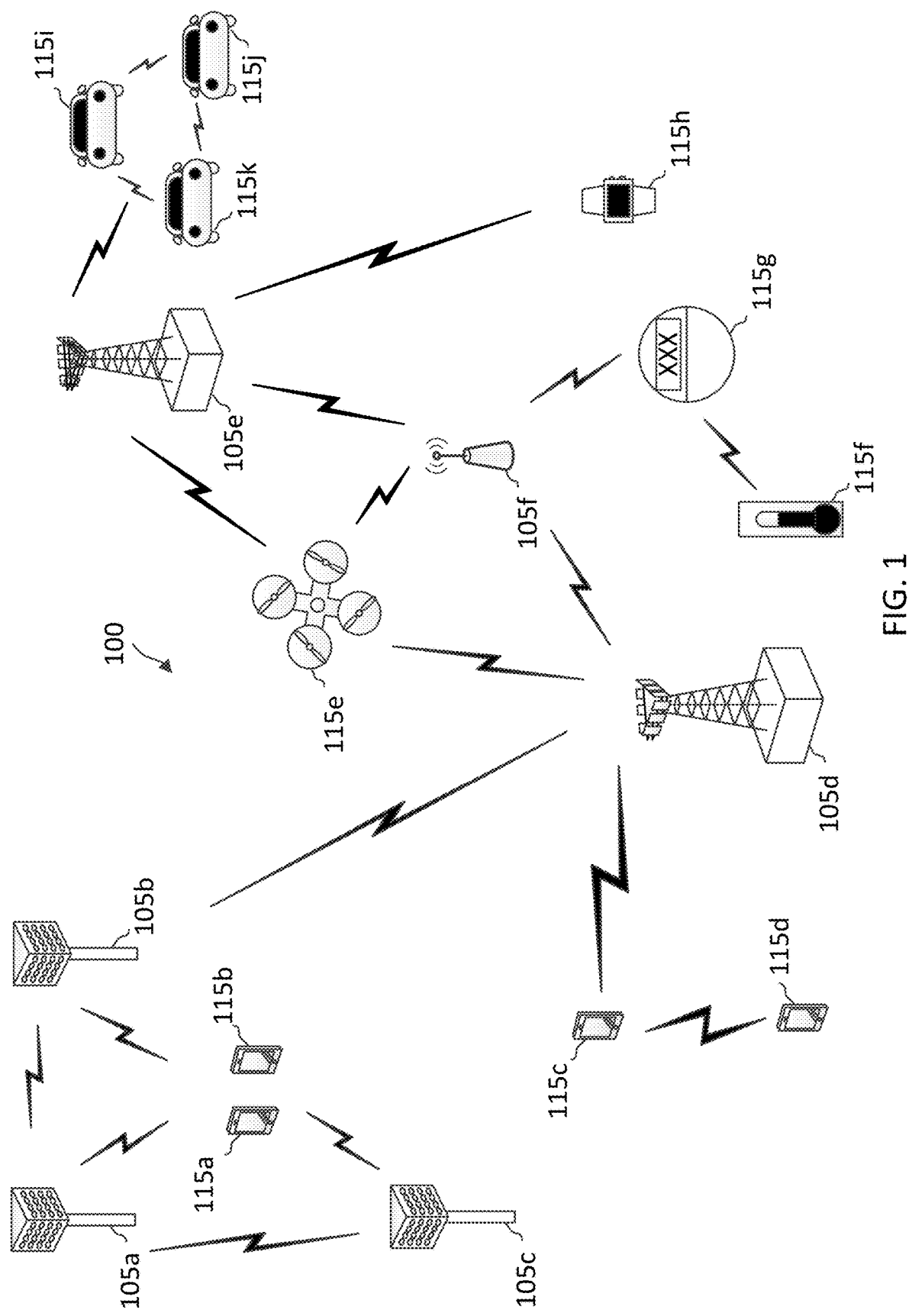
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km²), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Hybrid automatic repeat request (HARQ) is a physical layer protocol, which combines the use of forward error correction (FEC) with automatic repeat request (ARQ)-control. For instance, a transmitting node may transmit a data transmission with FEC encoding to a receiving node. When FEC decoding is successful at the receiving node, the receiving node may feedback an acknowledgement (ACK) to the transmitter. When FEC decoding fails at the receiving node, the receiving node may feedback a negative-acknowledgement (NACK) to the transmitting node. Upon receiving a NACK, the transmitting node may perform a retransmission. The transmitting node may retransmit the data transmission until an ACK is received from the receiving node or when the number of retransmissions reaches a certain limit.

HARQ techniques are commonly used in unicast services to provide high-reliability communications. While HARQ techniques can also be applied to multicast services to improve communication reliability, currently HARQ is not applied to multicast services due to the complexity of having to receive and manage ACK/NACK feedbacks from a large number of recipients or user equipment devices (UEs). One approach to reducing the amount of feedback signaling and feedback resources is to assign all UEs in a multicast group with the same resource for NACK-only feedbacks. In other words, if a receiving UE fails to receive a multicast transmission, the receiving UE may transmit a NACK feedback in the resource. On the other hand, if a receiving UE successfully receives the multicast transmission, no ACK feedback is transmitted. While the use of a common NACK resource with group NACK feedbacks can reduce feedback resource usage and signaling, the network may not be aware of whether a UE miss-detects a scheduling grant for a multicast transmission or the UE falsely detects a multicast transmission. For instance, a missed detection of a multicast scheduling grant at the UE (e.g., due to a discontinuous transmission (DTX) operation) may cause the network to interpret the lack of a NACK feedback from the UE as a successful reception of the multicast transmission while the UE did not receive the multicast transmission. Similarly, a NACK feedback due to a false detection of a multicast transmission at the UE may cause the network to unnecessarily retransmit a multicast transmission. Further, when all multicast UEs use the common NACK resource for group NACK feedbacks, the network may not be able to estimate UE-specific channel state information (CSI) from the NACK feedbacks.

Another approach to multicast feedback is to assign each UE in a multicast group with a UE-specific feedback resource where the UE may transmit an ACK upon a successful reception of a multicast transmission or an NACK upon a failed reception of a multicast transmission. The use of UE-specific feedback resource with the ACK/NACK feedback may allow the network to detect a missed detection of a multicast scheduling grant at a receiving UE, for example, when no feedback is received from the UE. Additionally, the network may utilize the ACK/NACK feedbacks received from the UE-specific resource to estimate UE-specific CSI information, which may be useful for subsequent multicast scheduling and/or beamforming. However, the resource usage and signaling for the UE-specific ACK/NACK approach can be large and can increase as the number of UEs in the group increases. As such, there is a compromise between the common group NACK-only feedback approach and the UE-specific ACK/NACK feedback approach.

In an example of NR vehicle-to-everything (V2X), a sidelink source UE (or source UE) may transmit sidelink communications to a group of sidelink receiving UEs (or destination UEs) via groupcasting and may apply HARQ techniques to the groupcasting. For instance, a source UE may transmit sidelink control information (SCI) (e.g., in a physical sidelink control channel (PSCCH)) to indicate a groupcast transmission and to identify corresponding destination sidelink UEs. Additionally, the source UE may indicate in the SCI whether the destination UEs are to feedback a NACK-only feedback using a common resource (e.g., in a physical sidelink feedback channel (PSFCH)) or feedback an ACK or a NACK using UE-specific resources (e.g., in a PSFCH). The source UE may transmit the groupcast transmission (e.g., in a physical sidelink shared channel (PSSCH)) and may determine whether to retransmit the groupcast transmission based on feedbacks received from the destination UEs. Thus, the indication of whether to use a group NACK-only feedback or a UE-specific ACK/NACK feedback in NR V2X groupcasting is per groupcast transmission (e.g., per PSSCH transmission). Further, when a UE-specific ACK/NACK is indicated for a PSSCH transmission, NR V2X restricts UE-specific ACK/NACK feedbacks to be from destination sidelink UEs that are located within a certain distance (e.g., a sidelink UE communication range) from a corresponding sidelink source UE. Destination sidelink UEs that do not meet the distance requirement may not send any feedback.

The use of HARQ in sidelink groupcast may be relatively less complex than a network using HARQ for multicast since the number of multicast UEs in a network may be significantly greater than the number of sidelink UEs in groupcasting. Additionally, the UEs in a network multicast group can be distributed over a large geographical area, whereas sidelink UEs in groupcasting may be located relatively close to each other.

The present disclosure provides techniques for multicast feedback with flexible switching between a common NACK-only feedback mode and a UE-specific ACK/NACK feedback mode. For instance, a BS may configure each UE in a multicast group with a multicast feedback configuration. The multicast feedback configuration may indicate a first resource configuration for a NACK feedback mode and a second resource configuration for an ACK/NACK feedback mode. The first resource configuration may be a common NACK resource configuration among all UEs in the multicast group (for NACK-only feedbacks). The second resource configuration may be a UE-specific ACK/NACK resource configuration designated to the respective UE (for ACK/NACK feedbacks). In some aspects, the BS may transmit a first multicast communication to the group of UEs. A first UE in the group may transmit a NACK feedback for the first multicast communication using the first resource configuration (upon failing to decode the first multicast communication correctly). The BS may transmit a second multicast communication to the group of UEs. The first UE may transmit an ACK feedback or a NACK feedback for the second multicast communication using the second resource configuration.

In some instances, the switching from the use of the first resource configuration for transmitting the NACK feedback for the first multicast communication to the use of the second resource configuration for transmitting the ACK feedback or the NACK feedback for the second multicast communication is in response to a multicast feedback mode switch trigger. The multicast feedback mode switch can be triggered via various mechanisms. For instance, the BS may instruct the first UE to switch between the NACK-only feedback mode and the ACK/NACK feedback mode, for example, based on a certain channel condition and/or a network load. In some instances, the BS may configure the first UE with rules to determine whether to utilize the NACK-only feedback mode or the ACK/NACK feedback mode for a particular multicast feedback. The rules can be based on channel measurements or conditions and/or multicast decoding status. For instance, the rules may include a pathloss threshold, a signal-to-interference-plus-noise ratio (SINR) threshold, a reference signal received power (RSRP) threshold, a channel quality indicator (CQI) threshold, or combinations thereof.

In some aspects, the BS may configure the first UE with a periodicity when the first UE may potentially switch from one of the NACK-only feedback mode or an ACK/NACK feedback mode to the other one of the NACK-only feedback mode or the ACK/NACK feedback mode. In some instances, the BS may restrict the first UE to perform the switch at the boundary of the periodicity if the first UE decides to switch the feedback mode. In some other instances, the BS may allow the first UE to switch at any time. In some instances, the first UE may not notify the BS of a feedback mode switch. In some instances, the first UE may notify the BS of a feedback mode switch. In some other instances, the first UE may request for a feedback mode switch from the BS.

In some aspects, the first resource configuration may include at least one of a different time configuration, a different frequency configuration, or a different sequence configuration than the second resource configuration. For instance, the NACK-only feedback or the ACK/NACK feedback may be transmitted in the form of a physical uplink control channel (PUCCH) format 0 sequence. The sequence configuration may indicate parameters for generating a base sequence. For instance, the first resource configuration may indicate one or more first sequence parameters for generating a sequence to represent a NACK-only feedback. The second resource configuration may indicate one or more second sequence parameters for generating a sequence to represent a NACK feedback and one or more third sequence parameters for generating a sequence to represent an ACK feedback. The first sequence parameters, the second sequence parameters, and the third sequence parameters can be different.

In some aspects, the first resource configuration and the second resource configuration may include the same time configuration and the same frequency configuration and the BS may apply code-division-multiplexing (CDM) to multiplex NACK feedbacks from UEs operating in the NACK-only feedback mode and ACK/NACK feedbacks from UEs operating in the ACK/NACK feedback mode.

Aspects of the present disclosure can provide several benefits. For example, the configuration of both common NACK-only feedback resources and UE-specific ACK/NACK feedback resource at each multicast UE can allow for flexible, dynamic switching between a NACK-only feedback mode and an ACK/NACK feedback mode. The configuration of rules for switching between the ACK/NACK feedback mode and the NACK-only feedback mode can provide a good compromise between resource usages and feedback information. For instance, in certain channel conditions, the UE-specific ACK/NACKs may not provide the network with useful channel information for multicast, and thus the NACK-only feedback mode may be used to minimize resource overhead. In other channel conditions, the UE-specific ACK/NACKs may provide the network with useful information for multicasting (e.g., for beamforming to reach certain UEs), and thus the UE-specific ACK/NACK feedback mode can be used as needed. The flexible switching between the ACK/NACK feedback mode and the NACK-only feedback mode allows a network to efficiently support HARQ in multicast with a minimal amount of feedback resources.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 (individually labeled as 115*a*, 115*b*, 115*c*, 115*d*, 115*e*, 115*f*, 115*g*, 115*h*, and 115*k*) and may also be referred to as an evolved node B (eNB), a next generation eNB (gNB), an access point (e.g., an IEEE 802.11 AP), and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

ABS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, an IEEE 802.11 terminal station (STA), or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f* The macro BS 105*d* may also transmit multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may serve a multicast service to a group of UEs 115. The network 100 may apply HARQ techniques to improve communication reliability for multicast. For instance, a BS 105 may transmit a multicast transmission to a group of UEs 115 belonging to a multicast service group (e.g., via subscriptions). The BS 105 may apply HARQ to the multicast transmission. The BS 105 may configure the UEs 115 to feedback a reception status for the multicast transmission. The BS 105 may determine whether to retransmit a multicast transmission based on feedbacks from the UEs 115. In some aspects, the BS 105 may configure the group of UEs 115 with a common resource for NACK-only feedbacks and may configure each UE 115 in the group with a UE-specific resource for an ACK feedback or a NACK feedback. The BS 105 may configure each multicast UE 115 to operate in a NACK-only feedback mode and/or a UE-specific ACK/NACK feedback mode at each UE 115. Additionally, the BS 105 may dynamically switch one or more UEs 115 in the group between the NACK-only feedback mode and the UE-specific ACK/NACK feedback mode, for example, depending on a network load and/or channel conditions. Further, the BS 105 may configure the UEs 115 in the group with rules to switch between the NACK-only feedback mode and the UE-specific ACK/NACK feedback mode. For instance, the rules may include various channel measurement criteria and/or data decoding criteria and corresponding thresholds. In some aspects, the BS 105 may apply CDM to multiplex the common NACK-only feedbacks and the UE-specific ACK/NACK feedbacks from the group of UEs 115 in the same time-frequency resource. Mechanisms for multicast feedbacks and multicast feedback mode switching are described in greater detail herein.

Figure 2:
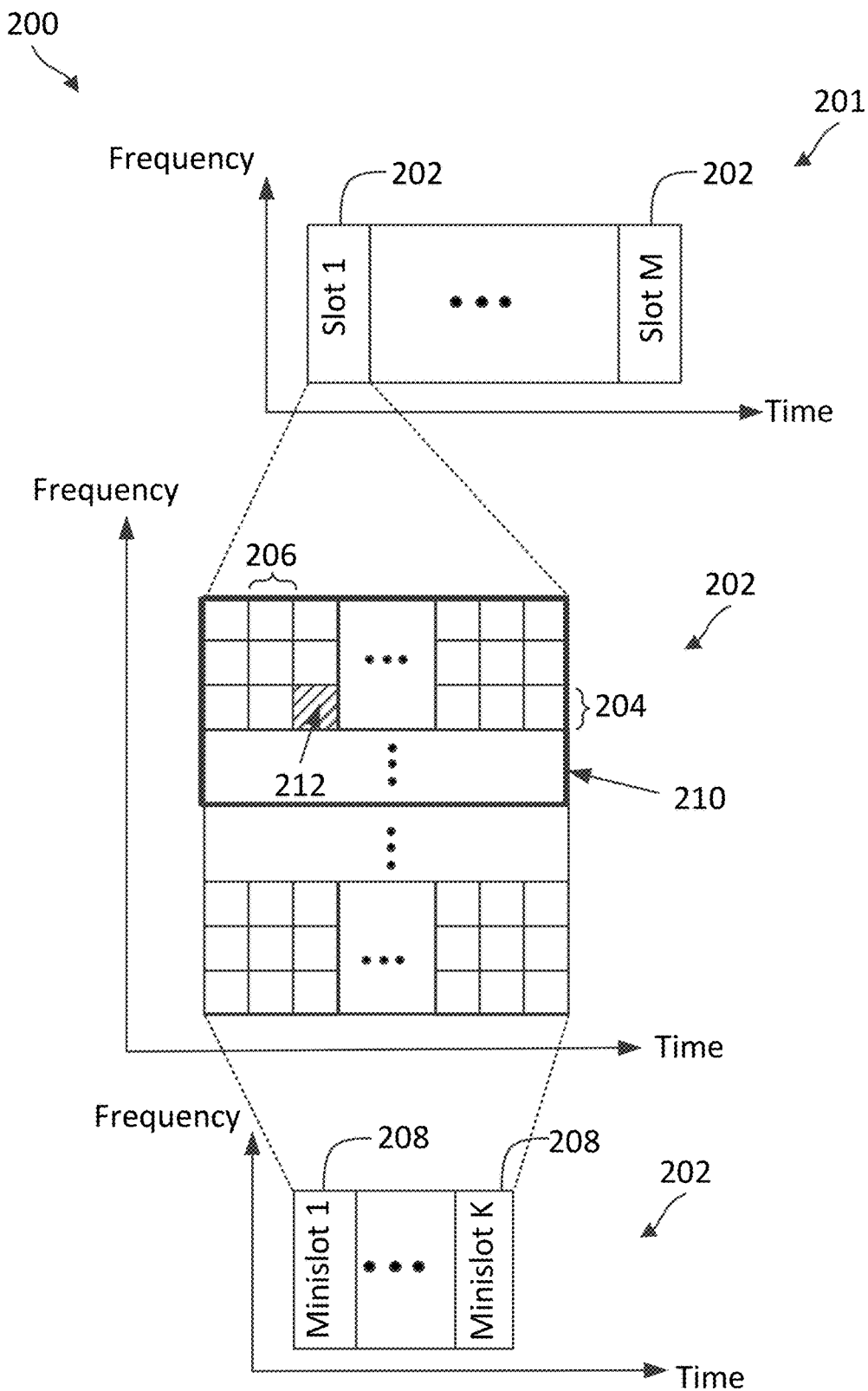
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
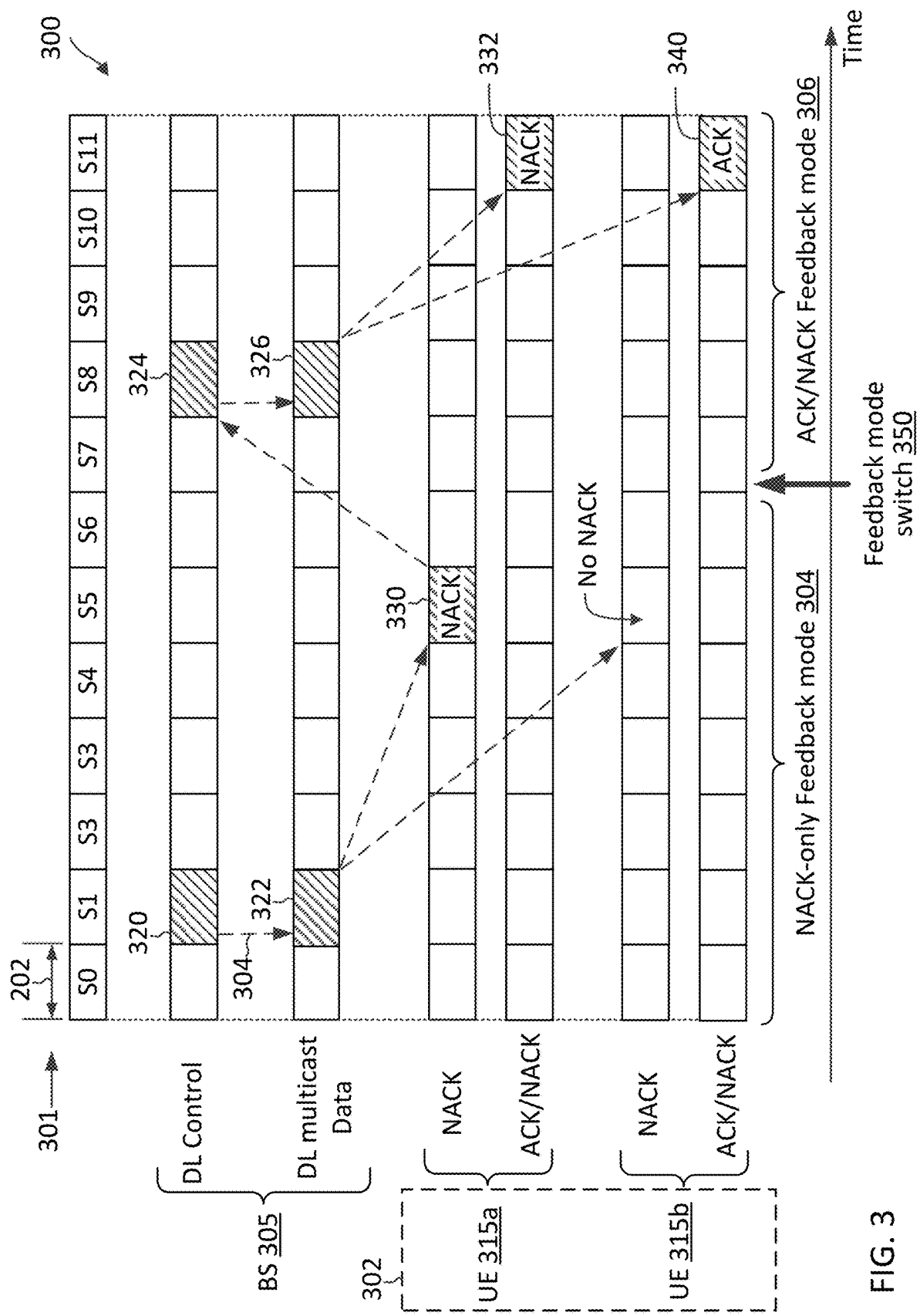
FIG. 3 illustrates a multicast communication scheme with feedback mode switching according to some aspects of the present disclosure.

FIG. 3 illustrates a multicast communication scheme 300 with feedback mode switching according to some aspects of the present disclosure. The scheme 300 may be employed by BSs such as the BSs 105 and UEs such as the UEs 115 in a network such as the network 100. In FIG. 3, the x-axis represents time in some arbitrary units. In particular, a BS (e.g., the BSs 105) may configure UEs (e.g., the UEs 115) in a multicast group with a common NACK-only feedback mode and/or a UE-specific ACK/NACK feedback mode and may dynamically switch the UEs between the common NACK-only feedback mode and the UE-specific ACK/NACK feedback mode as shown in the scheme 300. For simplicity of illustration and discussion, FIG. 3 illustrates a BS 305 serving two UEs 315 (shown as UE 315a and UE 315b) in a multicast group 302. However, the multicast group 302 may include any suitable number of UEs 315 (e.g., about 3, 4, 5, 10, 20, 30, 40, 50, 100 or more). In some instances, the BS 305 may correspond to a BS 105 of FIG. 1 and the UEs 315 may correspond to the UEs 115 of FIG. 1. Additionally, the scheme 300 is described using the same slot structure as in the radio frame structure 200, and may use the same reference numerals as in FIG. 2 for simplicity's sake.

FIG. 3 shows a frame structure 301 including a plurality of slots 202 in time. The slots 202 are indexed from S0 to S11. For example, the BS 305 may communicate with the UEs 315 in units of slots 202. The slots 202 may also be referred to as transmission time intervals (TTIs). Each slot 202 or TTI carry a medium access control (MAC) layer transport block. Each slot 202 may include a number of symbols in time and a number of frequency tones in frequency. Each slot 202 may include a DL control portion followed by at least one of a subsequent DL data portion, UL data portion, and/or a UL control portion. In the context of LTE or NR, the DL control portion, the DL data portion, the UL data portion, and the UL control portion may be referred to as a PDCCH, a PDSCH, a PUSCH, and a PUCCH, respectively.

In FIG. 3, the pattern-filled boxes represent transmissions of DL control information, DL data, UL ACK, and/or a UL NACK in corresponding slots 202. While an entire slot 202 is pattern-filled, a transmission may occur only in a corresponding portion of the slot 202. As shown, the BS 305 transmits DL control information 320 in the slot 202 indexed S1 (e.g., in a DL control portion of the slot 202). The DL control information 320 may indicate a DL multicast grant (e.g., multicast control information) for the UEs 315a and 315b in the multicast group 302. The DL multicast grant may be for a multicast data transmission 322 in the same slot 202 indexed S1. For instance, the multicast grant may be transmitted in the form of a DCI format encoded with a multicast group ID so that UEs 315a and the UEs 315b in the multicast group 302 may identify that the multicast grant is destined for the multicast group 302. After transmitting the DL control information 320, the BS 305 transmits multicast data 322 in the slot 202 indexed S1 (e.g., in a DL data portion of the slot 202) according to the multicast grant. In some instances, the multicast data 322 can be transmitted in a different slot 202 than the DL control information 320 carrying the multicast control information. The BS 305 may apply HARQ techniques to the multicast data transmission 322.

Upon detecting the multicast grant in the DL control information 320, the UE 315a and the UE 315b may receive the multicast data transmission 322 according to the multicast grant. Upon receiving the multicast data 322, the UEs 315a and the UE 315b may determine whether to feedback a reception status to the BS 305 and/or whether to feedback an ACK or a NACK to the BS 305. For instance, the BS 305 may have configured the UEs 315a and 315b with multicast feedback resources and a multicast feedback mode prior to transmitting the multicast data 322. The multicast resources may include a common NACK resource among the UEs 315 in the multicast group 302 and a UE-specific ACK/NACK resource for each of the UEs 315 in the multicast group 302 as will be discussed further below in FIGS. 4 and 5. The multicast feedback mode may include a NACK-only feedback mode 304 and a ACK/NACK feedback mode 306.

In the illustrated example of FIG. 3, the BS 305 configures the UE 315a and 315b to begin with the NACK-only feedback mode 304. In the NACK-only feedback mode 304, a UE 315 may transmit a NACK feedback if the UE 315 fails to receive a multicast transmission, but may refrain from transmitting an ACK feedback if the UE 315 successfully receives the multicast transmission. As an example, the UE 315a fails to receive and decode the multicast data 322. Thus, the UE 315a may transmit a NACK feedback 330 (e.g., a PUCCH signal) for the multicast data 322, for example, in a UL control portion of the slot 202 indexed S5. On the other hand, the UE 315b may have successfully received and decoded the multicast data 322, and thus may not transmit any feedback to the BS 305 (shown by the empty-filled box for the slot 202 indexed S5). In another scenario, the UE 315b may fail to receive the DL control information 320 for the multicast data 322. For example, the UE 315b may temporarily power down the frontend due to a due to discontinuous transmission (DTX) operation, and thus may miss the detection of the PDCCH carrying the DL control information 320 and may not transmit any feedback to the BS 305. In some instances, a multicast UE 315 may determine how to transmit a feedback for a multicast transmission based on a configuration (e.g., a PUCCH resource configuration) indicated by a corresponding multicast grant. For instance, the configuration may indicate a starting symbol, a number of symbols, a starting physical resource block (PRB), a number of PRBs, a PUCCH format, a cyclic shift, a frequency-hopping parameter, an orthogonal cover code (OCC) length and index, and/or a demodulation reference signal (DMRS) parameter.

Upon detecting the NACK feedback 330, the BS 305 may schedule a retransmission of the multicast data 322. For instance, the BS 305 may transmit DL control information 324 in the slot 202 indexed S8 indicating a DL multicast grant. The BS 305 may retransmit the multicast data 322 or its redundant version (RV) (shown as multicast data 326) in the slot 202 indexed S8. In some instances, the multicast data 326 can be transmitted in a different slot 202 than the DL control information 324 carrying the multicast control information. In some instances, the BS 305 may transmit the same coded version of multicast data in both the multicast data transmission 322 and the multicast data retransmission 326. In some other instances, the BS 305 may transmit different coded versions of multicast data for the multicast data transmission 322 and the multicast data retransmission 326. For instance, the multicast data transmission 322 may be transmitted with an RV of 0 and the multicast data retransmission 326 may be transmitted with an RV greater than 0.

In the illustrated example of FIG. 3, the BS 305 may switch the UEs 315a and 315b in the multicast group 302 from the NACK-only feedback mode 304 to the ACK/NACK feedback mode 306 (shown by the feedback mode switch 350) prior to the multicast data retransmission 326. The BS 305 may indicate the feedback mode switch 350 via various mechanisms, for example, RRC signaling or DCI signaling.

In some aspects, the BS 305 may indicate the feedback mode switch 350 using a certain entry in a PUCCH resource configuration to indicate a NACK-only mode. For instance, the BS 305 may include an entry for the NACK-only mode and an entry for ACK/NACK mode in the PUCCH resource configuration and may switch the UEs 315 between the NACK-only mode and the ACK/NACK mode using DCI. Alternatively, the BS 305 may add a new flag to the PUCCH resource configuration to indicate the NACK-only mode or the ACK/NACK mode. For instance, the BS 305 may set the flag to a value of 1 to indicate the NACK-only or a value of 0 to indicate the ACK/NACK mode.

In some aspects, the BS 305 may indicate the feedback mode switch 350 using existing fields in DCI (e.g., the DL control information 320 and/or 324), such as a redundancy version (RV) (RV=0 for initial transmission and RV=1,2,3 for retransmission assuming a maximum of 4 transmissions for multicast), and/or a new data indicator (NDI) (NDI=1 for an initial transmission). For instance, the ACK/NACK mode may be used for an initial transmission (when RV=0 and/or NDI=1) and the NACK-only mode may be used for a subsequent retransmission (when RV=1, 2, or 3). In some other instances, the BS 305 may configure the UEs 315a and/or 315b with some preconfigured feedback mode switching rules, for example, the ACK/NACK mode may be used for the first and second transmissions and the NACK-only mode may be used for subsequent retransmissions.

Upon receiving the multicast data retransmission 326, the UEs 315a and 315b may utilize the ACK/NACK feedback mode 306 to feedback a reception status of the multicast data retransmission 326 to the BS 305. In the ACK/NACK feedback mode 306, a UE 315 may transmit a NACK feedback if the UE 315 fails to receive a multicast transmission or an ACK feedback if the UE 315 successfully receives the multicast transmission. As an example, the UE 315a fails to receive and decode the multicast data 326. Thus, the UE 315a may transmit a NACK feedback 332 (e.g., a PUCCH signal) for the multicast data 326, for example, in a UL control portion of the slot 202 indexed S11. On the other hand, the UE 315b successfully received and decoded the multicast data 326, and thus may transmit an ACK feedback 340 (e.g., a PUCCH signal), for example, in a UL control portion of the slot 202 indexed S11.

Alternatively, for sake of power saving, if UE 315b received the initial transmission (e.g., multicast data 322) correctly, the UE 315b may skip detecting the retransmission (e.g., multicast data 326) and may not report PUCCH ACK/NACK configured for the retransmission. For the UE who may have missed the PDCCH (e.g., the DL control information 320) of the initial transmission, but received the PDCCH (e.g., the DL control information 324) of the retransmission, the UE can report ACK/NACK based on the detection of PDSCH multicast retransmission. In some aspects, the NACK feedback 330, the NACK feedback 332, and/or the ACK feedback 340 may be represented using PUCCH format 0.

Figure 4:
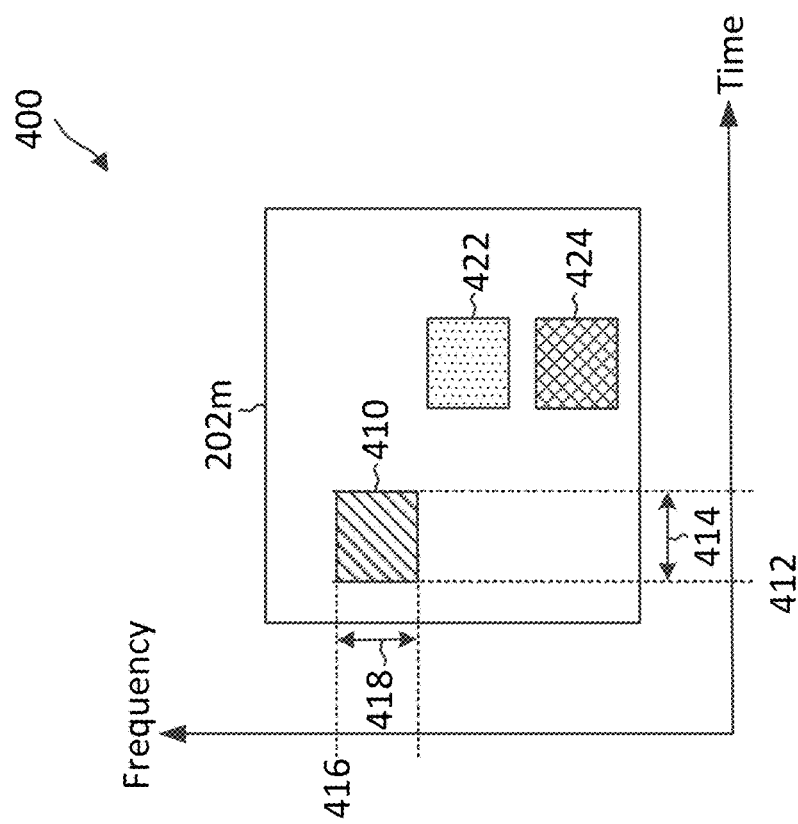
FIG. 4 illustrates a multicast feedback resource configuration scheme according to some aspects of the present disclosure.

As discussed above, the BS 305 may configure the UEs 315a and 315b in the multicast group 302 with various multicast feedback resources. For instance, the BS 305 may configure the UEs 315a and 315b in the multicast group 302 to use a common resource for NACK-only transmissions when the UEs 315a and 315b operate in the NACK-only mode 304 and may configure each UE 315a, 315b in the multicast group 302 with a UE-specific resource for ACK/NACK transmissions when the UEs 315a and 315b operate in the ACK/NACK feedback mode 306 as shown in FIG. 4. Alternatively, the BS 305 may configure the UEs 315a and 315b in the multicast group 302 with the same time-frequency resource and apply CDM to multiplex group NACK transmissions and UE-specific ACK/NACK transmissions as shown in FIG. 5.

Figure 5:
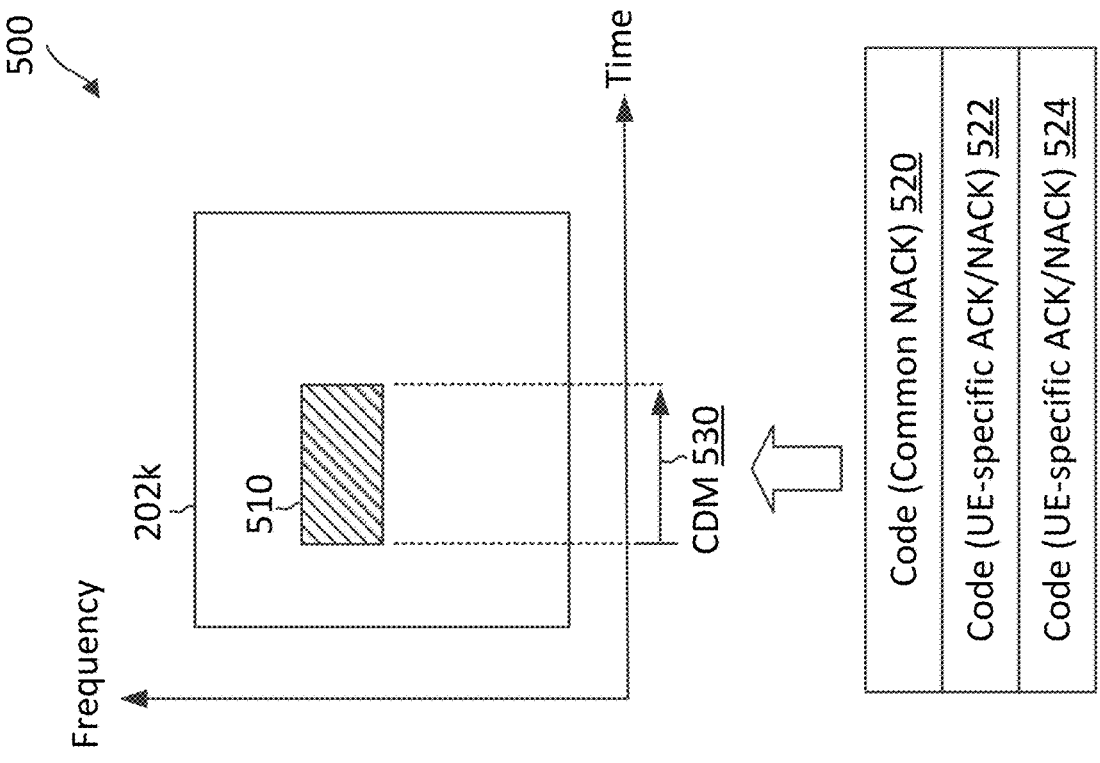
FIG. 5 illustrates a multicast feedback resource configuration scheme according to some aspects of the present disclosure.

FIGS. 4 and 5 are discussed in relation to FIG. 3 to illustrate the configuration and usage of multicast feedback resources. In the context of NR, multicast feedbacks are carried by PUCCH, and thus the multicast feedback resources may also be referred to as PUCCH resources.

FIG. 4 illustrates a multicast feedback resource configuration scheme 400 according to some aspects of the present disclosure. The scheme 400 may be employed by BSs such as the BSs 105 and 305 and UEs such as the UEs 115 and 315 in a network such as the networks 100 and 200. In particular, the BS 305 may configure the UEs 315 in the multicast group 302 to use different resources for NACK-only feedbacks (e.g., the NACK feedbacks 330) and ACK/NACK feedbacks (e.g., the NACK feedback 332 and ACK feedback 340) as shown in the scheme 400. In FIG. 4, the x-axis represents time in some arbitrary units, and the y-axis represents frequency in some arbitrary units. Additionally, the scheme 400 is described using the same slot structure as in the radio frame structure 200, and may use the same reference numerals as in FIG. 2 for simplicity's sake.

In the scheme 400, the BS 305 may configure all UEs 315 (the UE 315a and the UE 315b) in the multicast group 302 with a common resource configuration (e.g., a PUCCH resource configuration) for NACK-only feedback operations. For instance, the common resource configuration may indicate a common NACK resource 410 within a slot 202m. The common resource configuration may indicate a starting symbol index 412 (e.g., the symbols 206) within a slot 202m, a number of symbols 414, a starting RB index 416 (e.g., the RBs 210), and a number of RBs 418 for the common NACK resource 410. Additionally, the common resource configuration may indicate a common sequence configuration (e.g., a scrambling code and/or a cyclic-shift) for generating a sequence to indicate a NACK feedback. In some instances, the scrambling code may correspond to a group UE ID for the multicast group 302. The common NACK resource 410 and/or the common sequence configuration are shared by all UEs 315 in the multicast group 302 for transmitting NACK-only feedbacks.

The BS 305 may configure each UE 315a, 315b with a UE-specific resource configuration for ACK/NACK feedback operations. For instance, the BS 305 may configure the UE 315a with a UE-specific resource configuration indicating a resource 422 designated to the UE 315a for ACK/NACK feedbacks. Similar to the common resource configuration, the UE-specific resource configuration may indicate a starting symbol index, a number of symbols, a starting RB index, and/or a number of RBs for the resource 422. Additionally, the UE-specific resource configuration may indicate a sequence configuration (e.g., scrambling code and/or a cyclic-shift) for the UE 315*a* to generate a signal sequence or waveform sequence to represent a NACK and/or a signal sequence or waveform sequence to represent an ACK. In some aspects, the signal sequence can be a PUCCH format 0 sequence.

Similarly, the BS 305 may configure the UE 315*b* with a UE-specific resource configuration indicating a resource 424 designated to the UE 315*b* for ACK/NACK feedbacks. The UE-specific resource configuration may indicate a starting symbol index, a number of symbols, a starting RB index, and/or a number of RBs for the resource 424. Additionally, the UE-specific resource configuration may indicate a sequence configuration (e.g., scrambling code and/or a cyclic-shift) for the UE 315*b* to generate a signal sequence or waveform sequence to represent a NACK and/or a signal sequence or waveform sequence to represent an ACK.

Referring to the example shown in FIG. 3, the UE 315*a* may transmit the NACK feedback 330 (when operating in the NACK-only feedback mode 304) in a resource within the slot 202 indexed S5 based on the common resource configuration. For instance, if the common NACK resource 410 occupies 2 symbols beginning at symbol index 2 and occupies 2 RBs beginning at RB index 1 within the slot 202*m*, the UE 315*a* may transmit the NACK feedback 330 in a resource within the slot 202 indexed S5, where the resource may occupy 2 symbols beginning at symbol index 2 and 2 RBs beginning at RB index 1 within the slot 202 indexed S5. Similarly, the UE 315*a* may transmit the NACK feedback 332 (when operating in the ACK/NACK feedback mode 306) in a resource within the slot 202 indexed S11 based on the configuration for the UE-specific ACK/NACK resource 422 designated to the UE 315*a*. For instance, if the UE-specific ACK/NACK resource 422 occupies 2 symbols beginning at symbol index 4 and occupies 2 RBs beginning at RB index 10 within the slot 202*m*, the UE 315*a* may transmit the NACK feedback 332 in a resource within the slot 202 indexed S11, where the resource may occupy 2 symbols beginning at symbol index 4 and 2 RBs beginning at RB index 10 within the slot 202 indexed S11.

In some aspects, the BS 305 may indicate the common resource configuration for the common NACK resource 410 to the UE 315*a* and/or the UE 315*b* via RRC signaling (e.g., in a SIB) and/or UE-specific signaling. The BS 305 may indicate the configuration for the UE-specific ACK/NACK resource 422 to the UE 315*a* and/or the configuration for the UE-specific ACK/NACK resource 424 to the UE 315*b* via UE-specific signaling.

While FIG. 4 is illustrates a single common resource 410 for the multicast group 302, a single UE-specific ACK/NACK resource 422 for the UE 315*a*, and a single UE-specific ACK/NACK resource 424 for the UE 315*b*, the scheme 400 may allocate a PUCCH resource for each code block group (CBG) or each TB, where each PUCCH resource may include a time-frequency resource and associated cyclic-shift and/or sequence generation parameter(s). In other words, the BS 305 may configure a multicast UE 315 with a set of common PUCCH resources for per CBG or per TB NACK-only feedbacks and a set of UE-specific PUCCH resources foe per CBG per TB ACK/NACK feedbacks.

FIG. 5 illustrates a multicast feedback resource configuration scheme 500 according to some aspects of the present disclosure. The scheme 500 may be employed by BSs such as the BSs 105 and UEs such as the UEs 115 in a network such as the network 100. In particular, the BS 305 may configure the UEs 315 in the multicast group 302 with the same time-frequency resource for NACK-only feedbacks (e.g., the NACK feedback 330) and for UE-specific ACK/NACK feedbacks (e.g., the NACK feedback 332 and the ACK feedback 340) and may apply CDM to multiplex the common group NACK-only feedbacks and UE-specific ACK/NACK feedbacks as shown in the scheme 500. In FIG. 5, the x-axis represents time in some arbitrary units, and the y-axis represents frequency in some arbitrary units. Additionally, the scheme 500 is described using the same slot structure as in the radio frame structure 200, and may use the same reference numerals as in FIG. 2 for simplicity's sake.

In the scheme 500, the BS 305 may configure all UEs 315 (the UE 315*a* and the UE 315*b*) in the multicast group 302 with a multicast feedback resource configuration indicating a resource 510 (or a set of resources) for NACK-only feedbacks when operating in the NACK-only feedback mode 304 or ACK/NACK feedbacks when operating in the ACK/NACK feedback mode 306. For instance, the multicast feedback resource configuration may indicate a starting symbol index within a slot 202*m*, a number of symbols, a starting RB index, a number of RBs for a resource 510. The BS 305 may apply CDM 530 (e.g., with symbol repetitions in time) to multiplex NACK-only transmissions (e.g., the NACK feedback 330) from the UEs 315 operating in the NACK-only feedback mode 304 and UE-specific ACK/NACK transmissions (e.g., the NACK feedback 332 and the ACK feedback 340) from the UEs 315 operating in the ACK/NACK feedback mode 306. The BS 305 may configure all the UEs 315 with a common code for NACK-only feedbacks and may configure each UE 315 with a UE-specific code for ACK/NACK feedbacks. For instance, the BS 305 may configure all the UEs 315 (e.g., the UEs 315*a* and 315*b*) in the multicast group 302 with a common code 520 for NACK-only feedbacks. The BS 305 may configure the UE 315*a* with a code 522 for UE-specific ACK/NACK feedbacks and may configure the UE 315*b* with a code 524 for UE-specific ACK/NACK feedbacks. In some instances, the codes 520, 522, and 524 may be orthogonal cover code (OCC) so that the BS 305 may differentiate the different feedback transmissions from the different UEs 315 in the resource 510. Alternatively, the UE-specific ACK or the UE-specific NACK may be assigned with the same OCC, but with different cyclic shifts so that the BS 305 may differentiate between an ACK sequence and a NACK sequence.

Referring to the example shown in FIG. 3, the UE 315*a* may transmit the NACK feedback 330 (when operating in the NACK-only feedback mode 304) in a resource within the slot 202 indexed S5 based on the configuration for the resource 510 and the code 520. For instance, if the resource 510 occupies 4 symbols beginning at symbol index 2 and occupies 2 RBs beginning at RB index 1 within the slot 202*m*, the resource where the NACK feedback 330 is transmitted may occupy 4 symbols beginning at symbol index 2 and 2 RBs beginning at RB index 1 within the slot 202 indexed S5. Additionally, the UE 315*a* may apply symbol repetitions (e.g., about 4) and the code 520 across the symbol repetitions. The BS 305 may monitor for a feedback in the slot 202 indexed S5 based on configuration for the resource 510, and the codes 520, 522, and 524. The BS 305 may detect the NACK feedback 330 from the UE 315*a*, for example, by applying the code 520 to a signal received in the slot 202 indexed S5.

Similarly, the UE 315*a* may transmit the NACK feedback 332 in a resource occupying 4 symbols beginning at symbol index 2 and 2 RBs beginning at RB index 1 within the slot 202 indexed S11 and may apply symbol repetitions (e.g., about 4) and the code 522 across the symbol repetitions. The UE 315a may transmit the ACK feedback 340 in the same resource as the NACK feedback 332, but may apply symbol repetitions (e.g., about 4) and the code 524 across the symbol repetitions. The BS 305 may monitor for a feedback in the slot 202 indexed S11 based on configuration for the resource 510, and the codes 520, 522, and 524. The BS 305 may detect the NACK feedback 332 from the UE 315a, for example, by applying the code 522 to a signal received in the slot 202 indexed S11 and may detect the ACK feedback 340 from the UE 315b, for example, by applying the code 524 to the received signal.

In some aspects, the BS 305 may indicate the resource configuration for the resource 510 and/or the common code 520 to the UE 315a and/or the UE 315b via RRC signaling (e.g., in a SIB) and/or UE-specific signaling. In some aspects, the BS 305 may indicate UE-specific code 522 to the UE 315a and/or the UE-specific code 524 to the UE 315b via DCI (e.g., the DCI 320 and/or 324 via an ACK/NACK resource indicator (ARI)) as will be discussed further below. Additionally, the BS 305 may indicate a power control configuration (e.g., a PUCCH power control configuration) for the transmission of a NACK-only feedback and/or a ACK/NACK feedback. For instance, the NACK-only feedback and the ACK/NACK feedback may use different, separate power control procedures. For example, a power control for the NACK-only feedback may include a first target received power (at a BS) and a first pathloss compensation coefficient and a power control for the ACK/NACK feedback may include a second target received power (at a BS) and a second pathloss compensation coefficient, where the first target received power is different than the second target received power and the first pathloss compensation coefficient is different than the second pathloss compensation coefficient. By using orthogonal PUCCH resources for a NACK-only feedback and for an ACK/NACK feedback, different target received powers may not impact the reception of each PUCCH feedback.

While FIG. 5 illustrates a single resource 510, the scheme 500 may allocate a PUCCH resource for each code block group (CBG) or each TB, where each PUCCH resource may include a time-frequency resource and associated cyclic-shift and/or sequence generation parameter(s). In other words, the BS 305 may configure a multicast UE 315 with a set of PUCCH resources for per CBG or per TB NACK-only feedbacks and/or per CBG or per TB UE-specific ACK/NACK feedbacks.

In some aspects, the BS 305 may configure the UEs 315 in the multicast group 302 to switch between the NACK-only feedback mode 304 and the ACK/NACK feedback mode 306 based on certain rules, conditions, or restrictions. In some aspects, the BS 305 may configure the UE 315 to select between the NACK-only feedback mode 304 or the ACK/NACK feedback mode 306 based on a DL multicast decoding status. For instance, the BS 305 may configure the UEs 315 to utilize the NACK-only feedback mode when feeding back a reception status for an initial transmission and utilize the ACK/NACK feedback mode when feeding back a reception status for a retransmission. In some instances, the BS 305 may configure the UEs 315 to utilize the NACK-only feedback mode when the number of failed receptions is below a threshold and utilize the ACK/NACK feedback mode when the number of failed receptions is above a threshold.

In some aspects, the BS 305 may configure the UE 315 to select between the NACK-only feedback mode 304 or the ACK/NACK feedback mode 306 based on a channel characteristic or measurement over a channel between the UE 315 and the BS 305. For instance, the UE 315 may perform measurements in the channel. If the channel measurement satisfies a certain threshold, the UE 315 may utilize the NACK-only feedback mode 304. If the channel measurement does not satisfy the threshold, the UE 315 may utilize the ACK/NACK feedback mode 306. In some aspects, the channel measurement may be a pathloss. In some aspects, the channel measurement may be a RSRP. In some aspects, the channel measurement may be a SINR. In some instances, the UE 315 may estimate, determine, or calculate the SINR from a DMRS received from the BS 305. In some instances, the UE 315 may estimate, determine, or calculate the SINR from a configured CSI-RS for the multicast. In some aspects, the channel measurement may be a CQI. In some aspects, the rules or restrictions may include a pathloss threshold, a SINR threshold, a RSRP threshold, or a CQI threshold, or combinations thereof.

Figure 6:
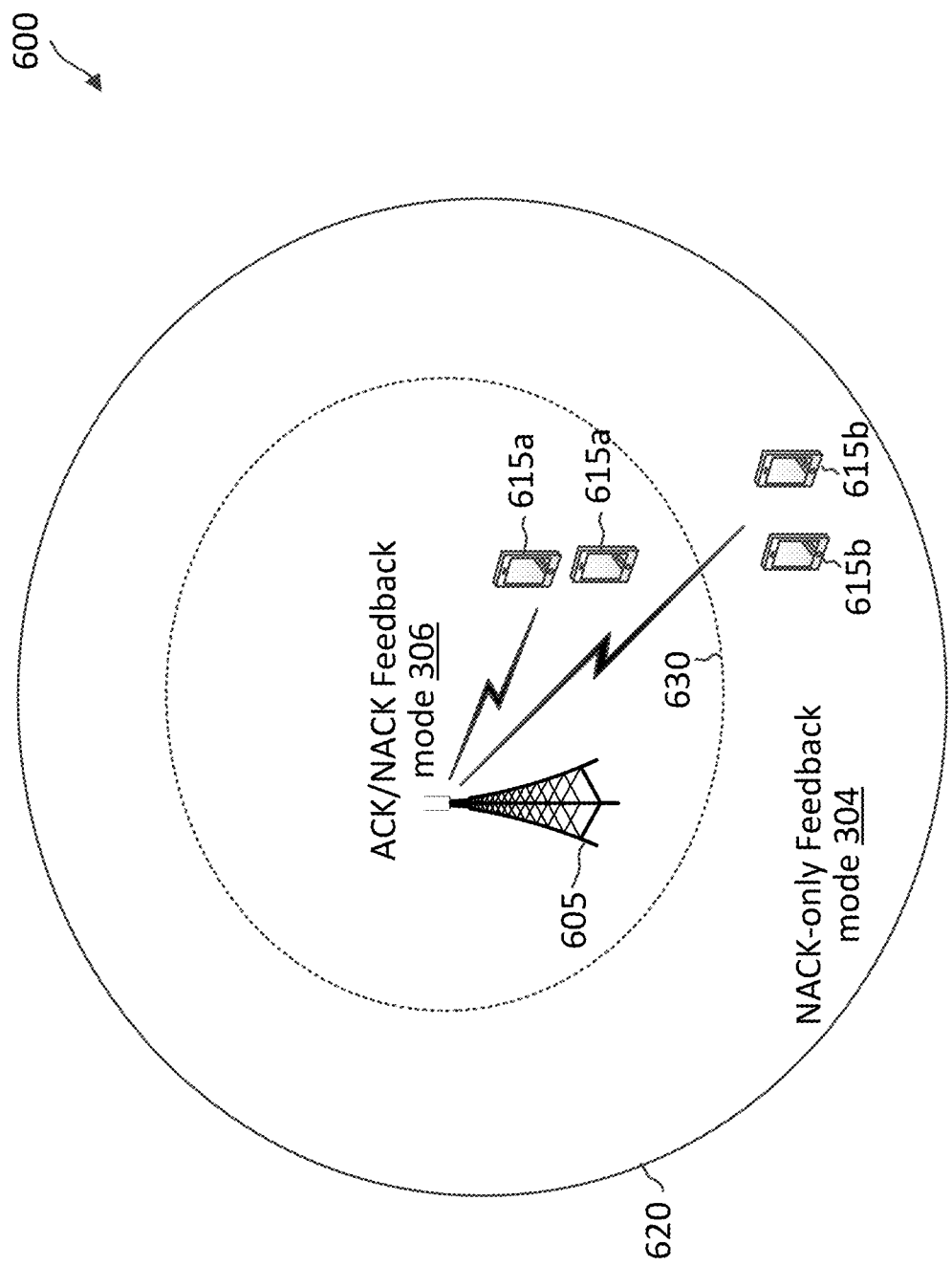
FIG. 6 illustrates a multicast feedback switching scenario according to some aspects of the present disclosure.

FIG. 6 illustrates a multicast feedback scenario 600 according to some aspects of the present disclosure. The scenario 600 may correspond to a multicast feedback scenario in the network 100. In the scenario 600, a BS 605 may serve multicast data to UEs 615a and UEs 615b belonging to a multicast group (e.g., the multicast group 302). The BS 605 may be substantially similar to the BSs 105 and/or 305. The UEs 615 may be substantially similar to the UEs 115 and/or 315. The UEs 615a may be located at a region near the BS 605 (shown by the inner circle 630). The UEs 615b may be located at region farther away from the BS 605 (shown by the outer circle 620). The channel condition between the UEs 615a and the BS 605 may be good (e.g., a high SINR). For instance, each of the UEs 615a may have a SINR greater than a certain threshold. The channel condition between the UEs 615b and the BS 605 may be bad (e.g., a low SINR). For instance, each of the UEs 615b may have a SINR below the threshold.

In the scenario 600, the BS 605 may configure the UEs 615a (in the inner circle 630) with the high SINRs to utilize the UE-specific ACK/NACK feedback mode 306 and may configure the UEs 615b (in the outer circle 620) with the low SINRs to utilize the NACK-only feedback mode 304. Since each UE 615a may transmit an ACK or a NACK using UE-specific resources and the channel condition is good, the BS 605 may estimate accurate CSI from the ACK/NACK feedbacks and may utilize the estimated CSI for retransmission (e.g., for beamforming to the UEs 615a and 615b). Since the channel conditions for the UEs 615b are poor, the BS 605 may be unable to estimate accurate or useful CSI from signals received from the UEs 615b. Thus, as long as the BS 605 receives a NACK from the UE 615b, the BS 605 may retransmit a multicast transmission.

In some other aspects, the BS 605 may configure the UEs 615a (in the inner circle 630) with the high SINRs to utilize the NACK-only feedback mode 304 and may configure the UEs 615b (in the outer circle 620) with the low SINRs to utilize the UE-specific ACK/NACK feedback mode 306. Such a configuration may allow the BS 605 to be aware of which of the UEs 615b may have failed to receive a multicast transmission from the BS 605, and thus the BS 605 can retransmit the multicast, for example, with certain beamforming to better serve a retransmission to the UE 615b with the failed reception.

In some aspects, the BS 605 may define a rule to disable a UE to use the PUCCH resource (e.g., the resource 510) that is configured for NACK-only and ACK/NACK switching. For example, the BS 605 may indicate a RSRP threshold (via RRC signaling) and a cell-edge UE (e.g., a UE 615b (in the outer circle 620)) who has a low RSRP (e.g., less than a certain RSRP threshold) may not use the PUCCH resource configured for NACK-only and ACK/NACK switching. An example is that the UE may send a request for a handover due to the low RSRP measured from the serving cell and the BS 605 may configure the cell edge UE to utilize the UE-specific PUCCH resource for ACK/NACK feedback so that the BS 605 may know which data packet the cell-edge UE had failed to receive, and thus may forward the failed data packet to the target cell for the handover. This PUCCH resource may not be multiplexed with the PUCCH resource for flexible switching between different feedback mode.

Figure 7:
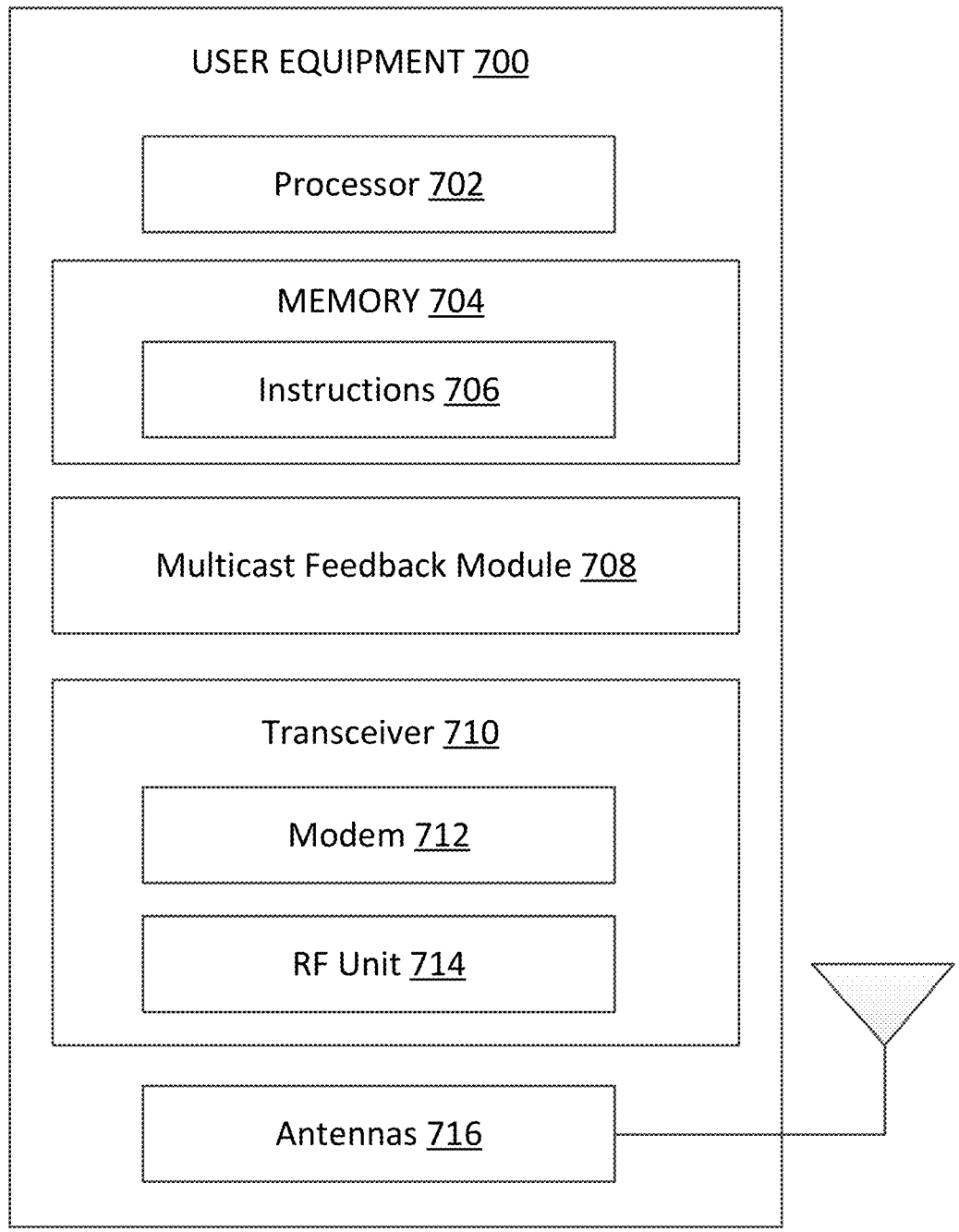
FIG. 7 is a block diagram of a user equipment (UE) according to some aspects of the present disclosure.

FIG. 7 is a block diagram of an exemplary UE 700 according to some aspects of the present disclosure. The UE 700 may be a UE 115 discussed above in FIG. 1, a UE 315 discussed above in FIG. 3, or a UE 615 discussed above in FIG. 6. As shown, the UE 700 may include a processor 702, a memory 704, a multicast feedback module 708, a transceiver 710 including a modem subsystem 712 and a radio frequency (RF) unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to the UEs 115 in connection with aspects of the present disclosure, for example, aspects of FIGS. 1-6 and 9-10. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The multicast feedback module 708 may be implemented via hardware, software, or combinations thereof. For example, the multicast feedback module 708 may be implemented as a processor, circuit, and/or instructions 706 stored in the memory 704 and executed by the processor 702. In some instances, the multicast feedback module 708 can be integrated within the modem subsystem 712. For example, the multicast feedback module 708 can be implemented by a combination of software components (e.g., executed by a DSP or a general processor) and hardware components (e.g., logic gates and circuitry) within the modem subsystem 712.

The multicast feedback module 708 may be used for various aspects of the present disclosure, for example, aspects of FIGS. 1-6 and 9-10. For instance, the multicast feedback module 708 is configured to configure receive, from a BS (e.g., the BSs 105, 305, and/or 605) a multicast feedback configuration for a multicast group that the UE 700 is subscribed to. The multicast feedback configuration may indicate a first resource configuration for a NACK feedback mode and a second resource configuration for an ACK/NACK feedback mode. The first resource configuration may be a common NACK resource configuration among all UEs in a multicast group including the UE 700 (for NACK-only feedbacks). The second resource configuration may be a UE-specific ACK/NACK resource configuration designated to the UE 700 (for ACK/NACK feedbacks). In some aspects, the multicast feedback module 708 is configured to receive a first multicast communication from the BS, transmit a NACK feedback for the first multicast communication to the BS using the first resource configuration (upon failing to decode the first multicast communication), receive a second multicast communication from the BS, and transmit an ACK feedback or a NACK feedback for the second multicast communication to the BS using the second resource configuration.

In some aspects, the multicast feedback module 708 is configured to receive, from the BS, an instruction to switch from one of the NACK-only feedback mode or the ACK/NACK feedback mode to the other one of the NACK-only feedback mode or the ACK/NACK feedback mode. For instance, the multicast feedback module 708 may switch from using the first resource configuration for transmitting the NACK feedback for the first multicast communication to using the second resource configuration for transmitting the ACK feedback or the NACK feedback for the second multicast communication in response to the instruction.

In some aspects, the multicast feedback configuration includes rules for switching between the NACK-only feedback mode and the ACK/NACK feedback mode. The rules can be based on channel measurements and/or UE decoding status. For instance, the rules can include a pathloss threshold, a SINR threshold, a RSRP threshold, a CQI threshold, or combinations thereof. In some instances, the multicast feedback module 708 may select the first resource configuration for transmitting the NACK feedback for the first multicast communication based on the rules and/or select the second resource configuration for transmitting the ACK feedback or the NACK feedback for the second multicast communication based on the rules.

In some aspects, the multicast feedback configuration includes a periodicity for switching between the NACK-only feedback mode and the ACK/NACK feedback mode. In some instances, the multicast feedback configuration may restrict the UE 700 to switch a feedback mode at the boundary of the periodicity if the UE 700 decides to switch the feedback mode. Thus, the multicast feedback module 708 may switch from one of the ACK/NACK feedback mode or the NACK-only feedback mode to the other one of the ACK/NACK feedback mode or NACK-only feedback mode at boundary of the periodicity. In some other instances, the multicast feedback configuration may allow the first UE to switch at any time. In some instances, the multicast feedback configuration may request the first UE not to notify the BS of a feedback mode switch. In some instances, the multicast feedback configuration may request the UE 700 to notify the BS of a feedback mode switch. Thus, the multicast feedback module 708 may transmit an indication to the BS after a feedback mode switch. In some instances, the multicast feedback module 708 may transmit, to the BS, a request to switch from one of the ACK/NACK feedback mode or the NACK-only feedback mode to the other one of the ACK/NACK feedback mode or NACK-only feedback mode. The request can be in the form of a scheduling request, a RSRP report, and/or a CSI report.

In some aspects, the first resource configuration may include at least one of a different time configuration, a different frequency configuration, or a different sequence configuration than the second resource configuration. In some other aspects, the first resource configuration and the second resource configuration may include the same time configuration and the same frequency configuration. The multicast feedback module 708 may receive, from the BS, an OCC a NACK-only transmission or an OCC for a ACK/NACK transmission. Mechanisms for multicast feedback with feedback mode switching are described in greater detail herein.

As shown, the transceiver 710 may include the modem subsystem 712 and the RF unit 714. The transceiver 710 can be configured to communicate bi-directionally with other devices, such as the BSs 105. The modem subsystem 712 may be configured to modulate and/or encode the data from the memory 704 and/or the multicast feedback module 708 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 714 may be configured to process (e.g., perform analog to digital conversion or digital to analog conversion, etc.) modulated/encoded data (e.g., multicast ACK/NACK feedbacks, multicast group NACKs, multicast feedback mode switch notification, multicast feedback mode switch request, CSI reports, RSRP reports, scheduling requests) from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 115 to enable the UE 115 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., multicast feedback configuration, multicast feedback resource configurations, multicast communications, multicast feedback mode switching instruction and/or rules) to the multicast feedback module 708 for processing. The antennas 716 may include multiple antennas of similar or different designs in order to sustain multiple transmission links. The RF unit 714 may configure the antennas 716.

In an aspect, the UE 700 can include multiple transceivers 710 implementing different RATs (e.g., NR and LTE). In an aspect, the UE 700 can include a single transceiver 710 implementing multiple RATs (e.g., NR and LTE). In an aspect, the transceiver 710 can include various components, where different combinations of components can implement different RATs.

Figure 8:
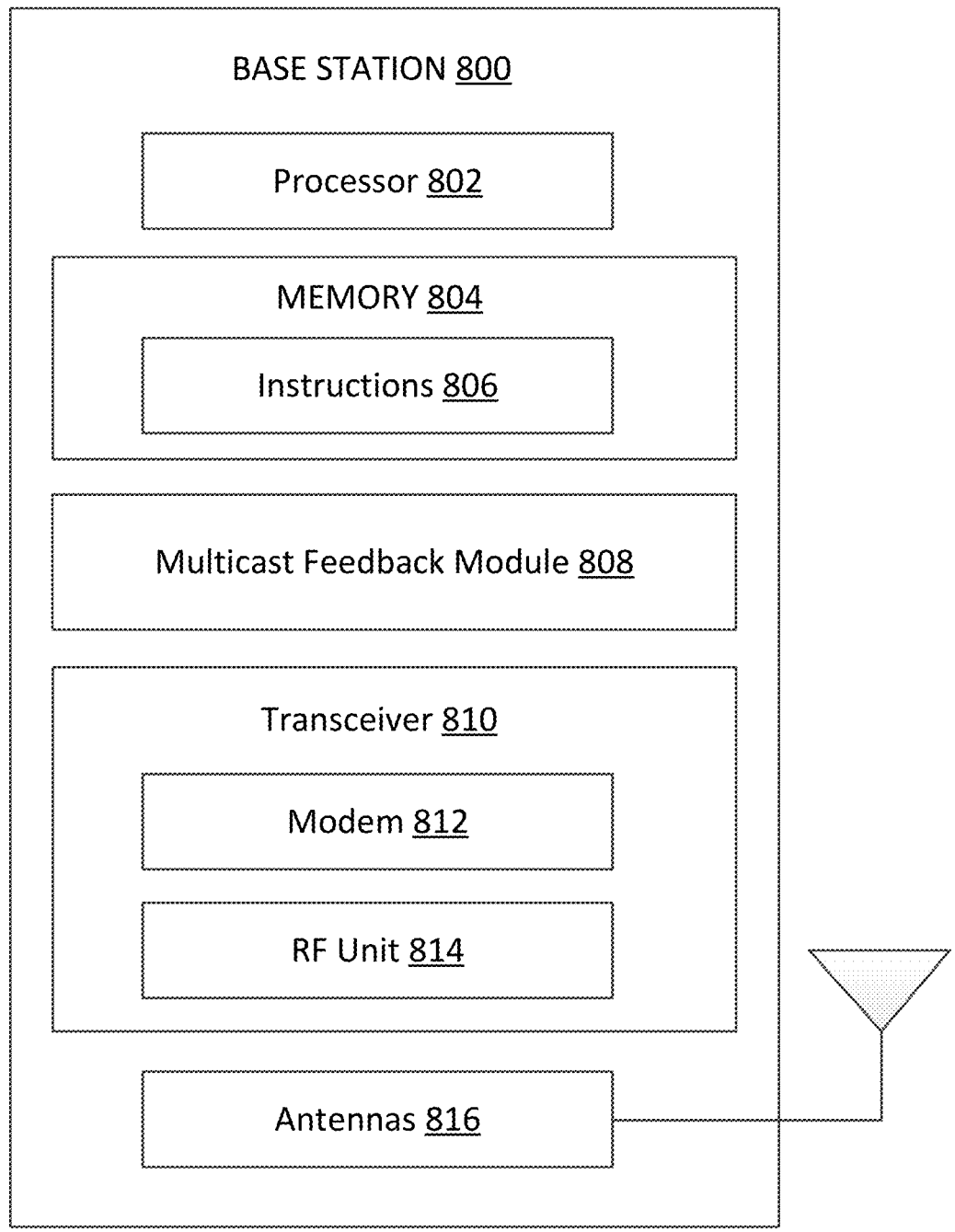
FIG. 8 is a block diagram of an exemplary base station (BS) according to some aspects of the present disclosure.

FIG. 8 is a block diagram of an exemplary BS 800 according to some aspects of the present disclosure. The BS 800 may be a BS 105 in the network 100 as discussed above in FIG. 1, a BS 305 discussed above in FIG. 3, or a BS 605 discussed above in FIG. 6. As shown, the BS 800 may include a processor 802, a memory 804, a multicast feedback module 808, a transceiver 810 including a modem subsystem 812 and a RF unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 1-3 and 6-15. Instructions 806 may also be referred to as code, which may be interpreted broadly to include any type of computer-readable statement(s) as discussed above with respect to FIG. 7.

The multicast feedback module 808 may be implemented via hardware, software, or combinations thereof. For example, the multicast feedback module 808 may be implemented as a processor, circuit, and/or instructions 806 stored in the memory 804 and executed by the processor 802. In some instances, the multicast feedback module 808 can be integrated within the modem subsystem 812. For example, the multicast feedback module 808 can be implemented by a combination of software components (e.g., executed by a DSP or a general processor) and hardware components (e.g., logic gates and circuitry) within the modem subsystem 812.

The multicast feedback module 808 may be used for various aspects of the present disclosure, for example, aspects of FIGS. 1-6, 9, and 11. For instance, the multicast feedback module 808 is configured to configure each UE (e.g., the UEs 115, 315, and/or 615) in a multicast group (e.g., the multicast group 302) with a multicast feedback configuration. The multicast feedback configuration may indicate a first resource configuration for a NACK feedback mode and a second resource configuration for an ACK/NACK feedback mode. The first resource configuration may be a common NACK resource configuration among all UEs in the multicast group (for NACK-only feedbacks). The second resource configuration may be a UE-specific ACK/NACK resource configuration designated to the respective UE (for ACK/NACK feedbacks). In some aspects, the multicast feedback module 808 is configured to transmit a first multicast communication to the group of UEs, receive a NACK feedback for the first multicast communication from one or more UEs of the group of UEs based on the first resource configuration, transmit a second multicast communication to the group of UEs, and receive an ACK feedback or a NACK feedback for the second multicast communication from a first UE of the one or more UEs based on the second resource configuration.

In some aspects, the multicast feedback module 808 is configured to transmit, to the first UE, an instruction to switch from one of the NACK feedback mode or the ACK/NACK feedback mode to the other one of the NACK feedback mode or the ACK/NACK feedback mode.

In some aspects, the multicast feedback module 808 is configured to include rules in the multicast feedback configuration for the first UE to select between the NACK feedback mode and the ACK/NACK feedback mode. The rules can be based on channel measurements and/or UE decoding status. In some instances, the rules can include a pathloss threshold, a SINR threshold, a RSRP threshold, a CQI threshold, or combinations thereof.

In some aspects, the multicast feedback module 808 is configured to include a switching periodicity in the multicast feedback configuration. In some instances, the multicast feedback configuration may restrict the first UE to switch a feedback mode at the boundary of the periodicity if the first UE decides to switch the feedback mode. In some other instances, the multicast feedback configuration may allow the first UE to switch at any time. In some instances, the multicast feedback configuration may request the first UE to notify the BS 800 of a feedback mode switch. In some instances, the multicast feedback configuration may request the first UE not to notify the BS 800 of a feedback mode switch. In some instances the multicast feedback module 808 is configured to receive a request from the first UE to switch from one of the ACK/NACK feedback mode or the NACK feedback mode to the other one of the ACK/NACK feedback mode or the NACK feedback mode. The request can be in the form of a scheduling request, a RSRP report, and/or a CSI report.

In some aspects, the first resource configuration may include at least one of a different time configuration, a different frequency configuration, or a different sequence configuration than the second resource configuration. In some other aspects, the first resource configuration and the second resource configuration may include the same time configuration and the same frequency configuration and the multicast feedback module 808 is configured to apply code-division-multiplexing (CDM) to multiplex NACK feedbacks from UEs operating in the NACK-only feedback mode and ACK/NACK feedbacks from UEs operating in the ACK/NACK feedback mode. Mechanisms for multicast feedback with feedback mode switching are described in greater detail herein.

As shown, the transceiver 810 may include the modem subsystem 812 and the RF unit 814. The transceiver 810 can be configured to communicate bi-directionally with other devices, such as the UEs 115 and/or 700 and/or another core network element. The modem subsystem 812 may be configured to modulate and/or encode data according to a MCS, e.g., a LDPC coding scheme, a turbo coding scheme, a convolutional coding scheme, a polar coding scheme, a digital beamforming scheme, etc. The RF unit 814 may be configured to process (e.g., perform analog to digital conversion or digital to analog conversion, etc.) modulated/encoded data (e.g., multicast feedback configuration, multicast feedback resource configurations, multicast communications, multicast feedback mode switching instruction and/or rules) from the modem subsystem 812 (on outbound transmissions) or of transmissions originating from another source such as a UE 115 and/or UE 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 105 to enable the BS 105 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, transmission of information to complete attachment to a network and communication with a camped UE 115 or 700 according to some aspects of the present disclosure. The antennas 816 may further receive data messages transmitted from other devices and provide the received data messages for processing and/or demodulation at the transceiver 810. The transceiver 810 may provide the demodulated and decoded data (e.g., multicast ACK/NACK feedbacks, multicast group NACKs, multicast feedback mode switch notification, multicast feedback mode switch request, CSI reports, RSRP reports, scheduling requests) to the multicast feedback module 808 for processing. The antennas 816 may include multiple antennas of similar or different designs in order to sustain multiple transmission links.

In an aspect, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Figure 9:
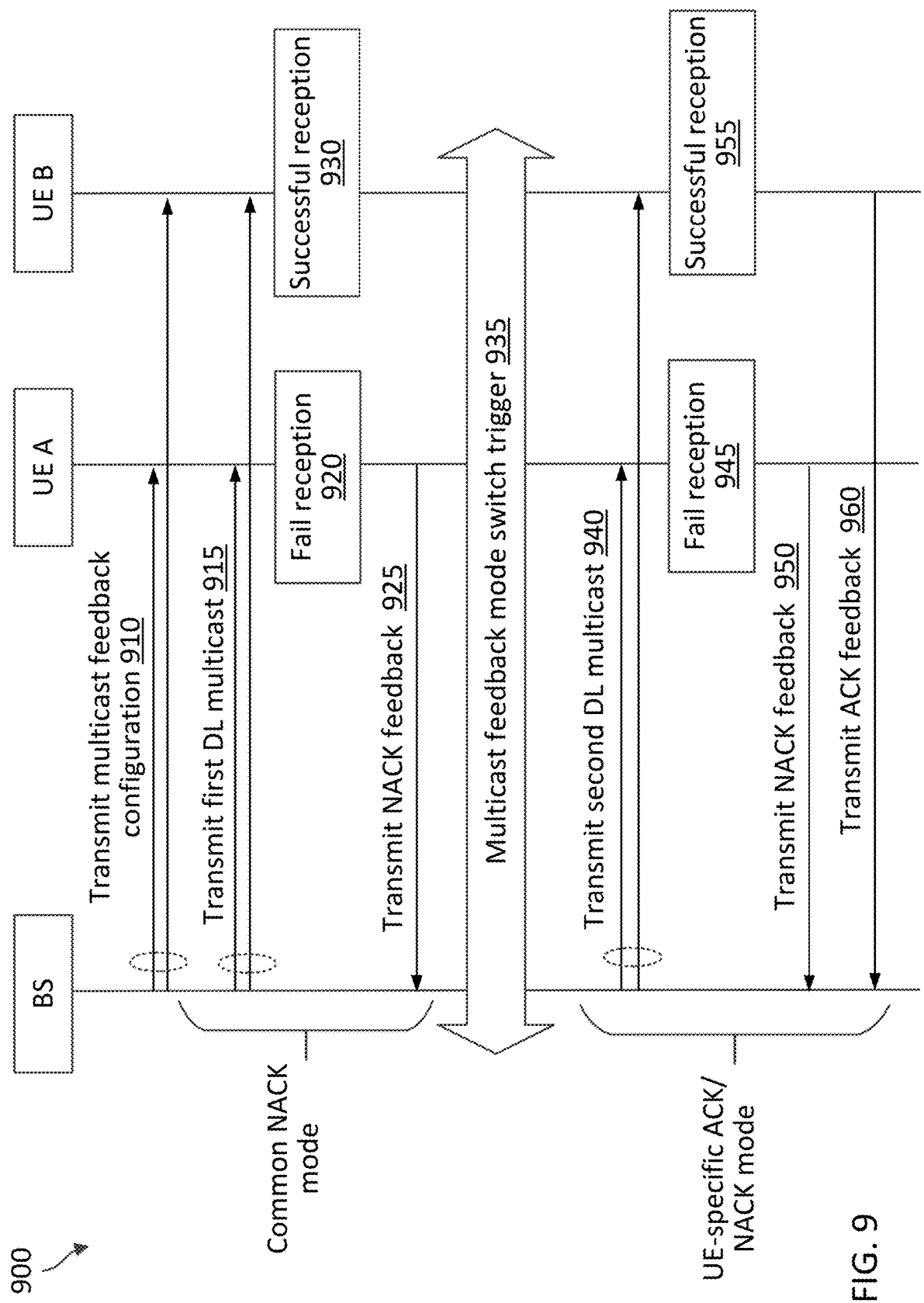
FIG. 9 is a signaling diagram of a multicast communication method with feedback mode switching according to some aspects of the present disclosure.

FIG. 9 is a signaling diagram of a multicast communication method 900 with feedback mode switching according to some aspects of the present disclosure. The method 900 may be implemented between a BS (e.g., BSs 105, 305, 605, and/or 800) and two UEs (e.g., UEs 115, 315, 615, and/or 700) shown as a UE A and a UE B. The UE A and the UE B may belong to a multicast group (e.g., the multicast group 302). The BS may utilize one or more components, such as the processor 802, the memory 804, the multicast feedback module 808, the transceiver 810, the modem 812, and the one or more antennas 816, to implement aspects of the method 900. Each of the UE A and the UE B may utilize one or more components, such as the processor 702, the memory 704, the multicast feedback module 708, the transceiver 710, the modem 712, and the one or more antennas 716, to implement aspects of the method 900. The method 900 may employ similar mechanisms as in the schemes 300, 400, and 500 described above with respect to FIGS. 3, 4, and 5, respectively. As illustrated, the method 900 includes a number of enumerated steps, but aspects of the method 900 may include additional steps before, after, and in between the enumerated steps. In some aspects, one or more of the enumerated steps may be omitted or performed in a different order.

At action 910, the BS transmits a multicast feedback configuration to the UE A and the UE B. The multicast feedback configuration may indicate a first resource configuration for a NACK-only feedback mode (e.g., the NACK-only feedback mode 304). The first resource configuration may be a common NACK resource configuration among UEs in the multicast group including the UE A and the UE B. The multicast feedback configuration may indicate a second resource configuration for an ACK/NACK feedback mode (e.g., the ACK/NACK feedback mode 306). The second resource configuration may be a UE-specific ACK/NACK resource configuration designated to the UE A. The multicast feedback configuration may also indicate a third resource configuration for an ACK/NACK feedback mode. The third resource configuration may be a UE-specific ACK/NACK resource configuration designated to the UE B. The BS may configure the UE A and the UE B to begin with the NACK-only feedback mode.

In some aspects, the BS may transmit the first resource configuration via RRC signaling (e.g., in a SIB). The BS may transmit the second resource configuration to the UE A and the third resource configuration to the UE B via RRC signaling or UE-specific signaling. In some aspects, the first resource configuration, the second resource configuration, and the third resource configuration may indicate different time and/or frequency resources (e.g., the resources 410, 422, and 424 discussed above in the scheme 400 with reference to FIG. 4) and/or different sequence parameters. In some aspects, the first resource configuration, the second resource configuration, and the third resource configuration may indicate the same time-frequency resource (e.g., the resource 510 discussed above in the scheme 500 with reference to FIG. 5), but different CDM codes (e.g., OCCs). In some aspects, the multicast feedback configuration may indicate various rules and/or thresholds (e.g., pathloss threshold, SINR threshold, RSRP threshold, and/or CQI threshold) for switching between the ACK/NACK feedback mode and the NACK-only feedback mode as discussed above with reference to FIGS. 5 and 6.

In some aspects, the BS may configure each of the UE A and the UE B in one of three feedback modes. For instance, the first mode may correspond to the NACK-only feedback mode and may include an indication of a common NACK-only resource among the group, the second mode may correspond to the ACK/NACK feedback mode and a UE-specific ACK/NACK resource, and the third mode may be a flexible mode with the ACK/NACK feedback mode and the NACK-only feedback mode and may include a time-frequency resource that can be used for a NACK-only transmission or an ACK/NACK transmission. The third mode may include different OCCs for the different NACK-only transmission and the ACK/NACK transmission. In some aspects, the BS may utilize a RRC configuration message with 2 bits indicate one of the three modes. For instance, a bit value of 00 may indicate the first mode, a bit value of 01 may indicate the second mode, and a bit value of 10 may indicate the third mode.

In some aspects, the BS may configure each of the UE A and the UE B with different power control procedures (e.g., PUCCH power control) for the NACK-only transmission and for the ACK/NACK transmission. For example, NACK-only transmission and for the ACK/NACK transmission may be configured with different received target power values and different pathloss compensation coefficients for power control. In the context of NR, the received target power may refer to the $P_{0,PUCCH}$ Parameter and the pathloss compensation coefficient may refer to the $\alpha_{PUCCH}$ parameter.

At action 915, the BS transmits a first DL multicast transmission to the UE A and the UE B. The BS may apply HARQ techniques for DL multicast as discussed above.

At action 920, the UE A fails to receive and decode the first DL multicast transmission correctly.

At action 925, in response to the failed reception and the active NACK-only feedback mode, the UE A transmits a NACK feedback (e.g., the NACK feedback 330) for the first DL multicast transmission to the BS, for example, in a common NACK resource based on the first resource configuration. In some instances, the UE A may apply a power control procedure (e.g., with a certain received target power and pathloss compensation) as configured by the BS for transmitting a NACK-only feedback.

At action 930, the UE B successfully receives the first DL multicast transmission. Since NACK-only feedback mode is active, the UE B may refrain from transmitting an ACK feedback to the BS.

At action 935, a multicast feedback mode switch is triggered. The switch can be triggered via various mechanisms. In some aspect, the BS may transmit an instruction instructing the UE A and/or the UE B to switch from the NACK-only feedback mode to the ACK/NACK feedback mode, via RRC signaling or medium access control-control element (MAC-CE) signaling (e.g., in a PDSCH). In some instances, the BS may transmit the instruction in a unicast transmission to the UE A (e.g., in a UE-specific RRC reconfiguration) and may the instruction (e.g., in a UE-specific RRC reconfiguration) via a unicast PDSCH transmission to the UE B. In some aspects, the UE A may transmit a unicast PUSCH and/or PUCCH to inform the BS of the switch, for example, via MAC-CE signaling, RSRP feedback reporting, and/or SINR feedback reporting. The signaling overhead with unicast signaling can be large as the number of UEs in a multicast group can be large.

In some aspects, to reduce the signaling overhead, the BS may include an indication of a switching periodicity (e.g., about 50 ms, 100 ms, or 200 ms) in the multicast feedback configuration at action 910. Based on the periodicity, the UE A may report to the BS indicating whether the UE A may transmit a ACK/NACK feedback for a multicast transmission and whether the UE A may operate in the NACK-only feedback mode or the ACK/NACK feedback mode for the feedback. For instance, if the periodicity is 100 ms, the UE A may transmit a report to the BS at every 100 ms. In some instances, the UE A may transmit a report including a feedback mode indication (e.g., a NACK-only feedback mode or a ACK/NACK feedback mode). In some other instances, the UE A may transmit a CSI report and/or a RSRP report and the BS may determine the feedback mode based on the CSI report and/or the RSRP report. As discussed above, the BS may configure the UE A with various thresholds for switching between the ACK/NACK feedback mode and the NACK-only feedback mode. As such, the BS may determine whether the UE A is operating in the ACK/NACK feedback mode to the NACK-only feedback mode based on the RSRP report and/or the CSI report received from the UE A.

In some aspects, the BS may further restrict the UE A to switch from one of the ACK/NACK feedback mode or the NACK-only feedback mode to the other one of the ACK/NACK feedback mode or the NACK-only feedback mode at the periodicity (e.g., when the UE A reports CSI/RSRP or feedback mode indication to the BS). For instance, if the periodicity is 100 ms, the UE A may switch the feedback mode at the boundaries of 100 ms.

In some aspects, the BS may allow the UE A to switch from one of the ACK/NACK feedback mode or the NACK-only feedback mode to the other one of the ACK/NACK feedback mode or the NACK-only feedback mode within the configured periodicity. In other words, the UE A to switch from one of the ACK/NACK feedback mode or the NACK-only feedback mode to the other one of the ACK/NACK feedback mode or the NACK-only feedback mode at any time. In some aspects, the BS may configure the UE A not to report the switch to the BS when the switch occurs within the periodicity (e.g., to reduce signaling overhead). In other words, the switch may be transparent to the BS, where the BS may monitor for common NACK-only feedbacks from the multicast group and UE-specific ACK/NACKs from the UE A without relying on the indication from the UE A. In some other aspects, the BS may configure the UE A to report the switch to the BS when the switch occurs within the periodicity. For instance, the UE A may transmit a request to switch from one of the ACK/NACK feedback mode or the NACK-only feedback mode to the other one of the ACK/NACK feedback mode or the NACK-only feedback mode. In some instances, the UE A may transmit the switch request in the form of a scheduling request (SR). Similarly, the UE B may perform feedback mode switching using some substantially similar mechanisms as the UE A. As an example, both the UE A and the UE B switch from the NACK-only feedback mode to the ACK/NACK feedback mode in response to the multicast feedback mode switch trigger.

At action 940, the BS transmits a second DL multicast transmission to the UE A and the UE B. For instance, the second DL multicast transmission may be a retransmission of the first DL multicast transmission in response to the NACK feedback received from the UE A.

At action 945, the UE A fails to receive the second DL multicast transmission correctly.

At action 950, in response to the failed reception and the active ACK/NACK feedback mode, the UE A transmits a NACK feedback (e.g., the NACK feedback 332) for the second DL multicast transmission to the BS, for example, in a UE-specific resource based on the second resource configuration discussed with reference to action 910. In some instances, the UE A may apply a power control procedure (e.g., with a certain received target power and pathloss compensation) as configured by the BS for transmitting an ACK/NACK feedback.

At action 955, the UE B successfully receives the second DL multicast transmission.

At step 960, in response to the successful reception and the active ACK/NACK feedback mode, the UE B transmits an ACK feedback (e.g., the ACK feedback 340) for the second DL multicast transmission to the BS, for example, in a UE-specific resource based on the third resource configuration discussed with reference to action 910. In some instances, the UE B may apply a power control procedure (e.g., with a certain received target power and pathloss compensation) as configured by the BS for transmitting an ACK/NACK feedback.

While FIG. 9 illustrates that the UE A and the UE B switch from the NACK-only feedback mode to the ACK/NACK feedback mode at the same time, in general, UEs in a multicast group can switch between the ACK/NACK feedback mode and the NACK-only feedback mode at different times. In other words, some multicast UEs in a group may operate in the NACK-only feedback mode, while other multicast UEs in the group may operate in the ACK/NACK feedback mode at a certain time.

Figure 10:
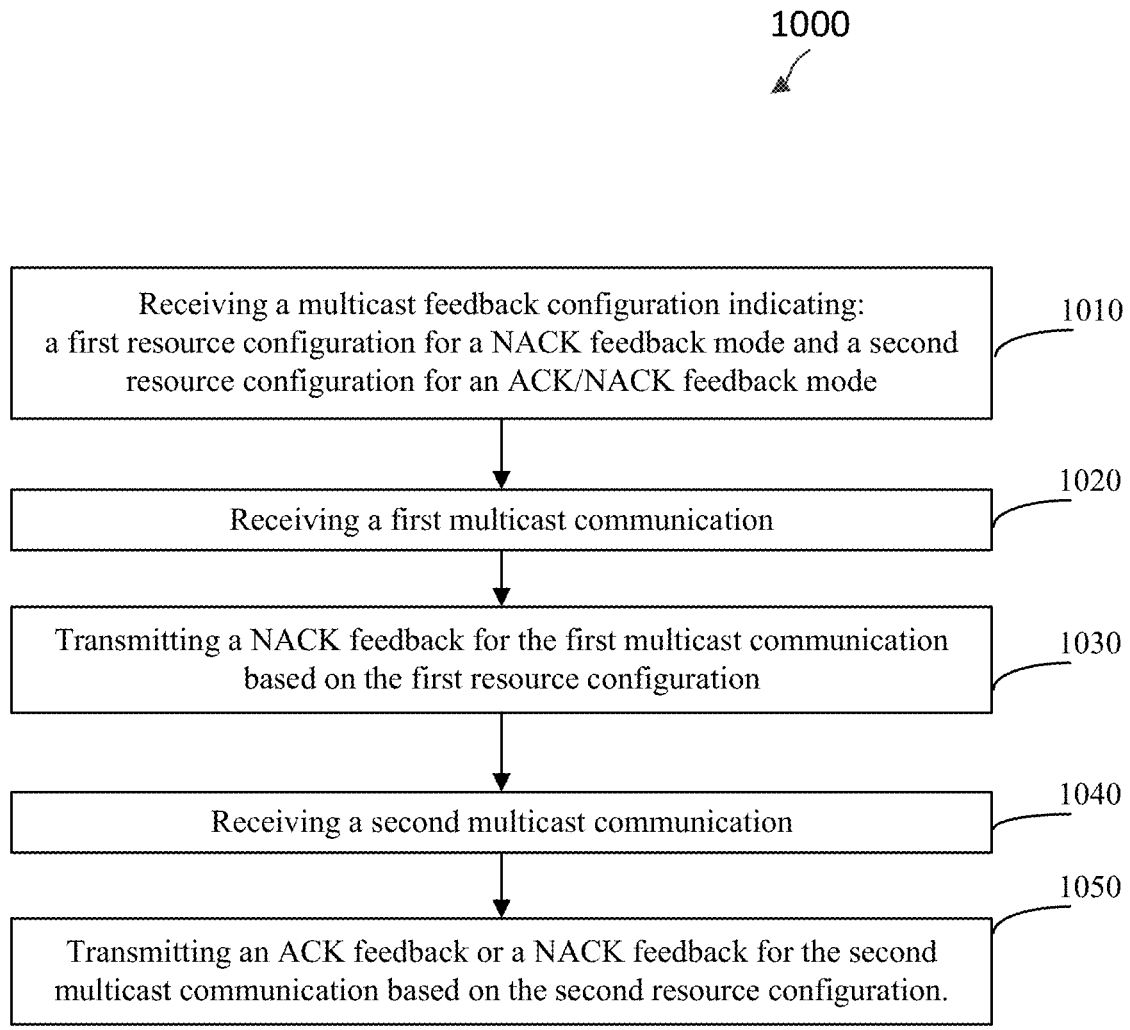
FIG. 10 is a flow diagram of a wireless communication method according to some aspects of the present disclosure.

FIG. 10 is a flow diagram of a wireless communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UEs 115, 315, 615, and/or 700, may utilize one or more components, such as the processor 702, the memory 704, the multicast feedback module 708, the transceiver 710, the modem 712, and the one or more antennas 716, to execute the steps of method 1000. The method 1000 may employ similar mechanisms as in the schemes 300, 400, and 500 discussed above with reference to FIGS. 3, 4, and/or 5, respectively, and/or the method 900 discussed above with reference to FIG. 9. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, a first UE (e.g., the UEs 115, 315, 615, and/or 700) receives, from a BS (e.g., the BSs 105, 305, 605, and/or 800), a multicast feedback configuration indicating a first resource configuration for a NACK feedback mode (e.g., the NACK-only feedback mode 304) and a second resource configuration for an ACK/NACK feedback mode (e.g., the ACK/NACK feedback mode 306). In some aspects, the first UE may utilize one or more components, such as the processor 702, the memory 704, the multicast feedback module 708, the transceiver 710, the modem 712, and the one or more antennas 716, to receive the multicast feedback configuration.

In some aspects, the first resource configuration may be a common NACK resource configuration among a group of UEs including the first UE and the second resource configuration may be a UE-specific ACK/NACK resource configuration designated to the first UE. In some aspects, the first resource configuration may include at least one of a different time configuration, a different frequency configuration, or a different sequence configuration than the second resource configuration, for example, as shown in the scheme 400 discussed above with reference to FIG. 4. In some aspects, the first UE may receive the first resource configuration for the NACK feedback mode via SIB signaling and may receive the second resource configuration for the ACK/NACK feedback mode via UE-specific signaling (e.g., a RRC configuration).

At block 1020, the first UE receives, from the BS, a first multicast communication. In some aspects, the first UE may utilize one or more components, such as the processor 702, the memory 704, the multicast feedback module 708, the transceiver 710, the modem 712, and the one or more antennas 716, and the one or more antennas 816, to receive the first multicast communication.

At block 1030, the first UE transmits, to the BS, a NACK feedback (e.g., the NACK feedback 330) for the first multicast communication based on the first resource configuration. In some aspects, the first UE may utilize one or more components, such as the processor 702, the memory 704, the multicast feedback module 708, the transceiver 710, the modem 712, and the one or more antennas 716, and the one or more antennas 816, to transmit the NACK feedback for the first multicast communication.

At block 1040, the first UE receives, from the BS, a second multicast communication. In some aspects, the first UE may utilize one or more components, such as the processor 702, the memory 704, the multicast feedback module 708, the transceiver 710, the modem 712, and the one or more antennas 716, to receive the second multicast communication.

At block 1050, the first UE transmits, to the BS, an ACK feedback or a NACK feedback (e.g., the NACK feedback 332 and the ACK feedback 340) for the second multicast communication based on the second resource configuration. In some aspects, the first UE may utilize one or more components, such as the processor 702, the memory 704, the multicast feedback module 708, the transceiver 710, the modem 712, and the one or more antennas 716, to transmit the ACK feedback or the NACK feedback for the second multicast communication.

In some aspects, the first UE may also receive, from the BS, an instruction to switch from one of the NACK feedback mode or the ACK/NACK feedback mode to the other of the NACK feedback mode or the ACK/NACK feedback mode, for example, via RRC signaling or DCI signaling. The transmitting the NACK feedback for the first multicast communication at block 1030 may be in response to receiving the instruction to switch from the ACK/NACK feedback mode to the NACK feedback mode. The transmitting the ACK feedback or the NACK feedback for the second multicast communication at block 1050 may be in response to receiving the instruction to switch from the NACK feedback mode to the ACK/NACK feedback mode.

In some aspects, the first resource configuration and the second resource configuration include a same frequency configuration and a same time configuration, for example, as shown in the scheme 500 discussed above with reference to FIG. 5. The multicast feedback configuration may further indicate a rule for selecting between the NACK feedback mode or the ACK/NACK feedback mode. In some aspects, the first UE may further receive, from the BS, a scheduling grant for the first multicast communication, where the scheduling grant may include a first spreading code for the NACK feedback mode and a second spread code for the ACK/NACK feedback mode and the second spreading code may be different from the first spreading code. The first UE may further select the first spreading code based on the rule and utilize the selected first spreading code for the transmitting the NACK feedback for the first multicast communication at block 1020. In some aspects, the first UE may further receive, from the BS, a scheduling grant for the second multicast communication, where the scheduling grant may include a first spreading code for the NACK feedback mode and a second spread code for the ACK/NACK feedback mode and the second spreading code may be different from the first spreading code. The first UE may select the second spreading code based on rule and utilize the selected second spreading code for the transmitting the ACK feedback or the NACK feedback for the second multicast communication at block 1050. In some aspects, the rule can be based on a pathloss, a SINR, a CQI, a RSRP, and/or a decoding status.

In some aspects, the multicast feedback configuration may indicate a periodicity for switching from the one of the NACK feedback mode or the ACK/NACK feedback mode to the other of the NACK feedback mode or the ACK/NACK feedback mode. The transmitting the NACK feedback for the first multicast communication or the transmitting the ACK feedback or the NACK feedback for the second multicast communication may be based on the periodicity. In some aspects, the multicast feedback configuration may restrict the switching from the one of the NACK feedback mode or the ACK/NACK feedback mode to the other of the NACK feedback mode or the ACK/NACK feedback mode within the periodicity.

In some aspects, the first UE may also transmit, to the BS, a request to switch from one of the NACK feedback mode or the ACK/NACK feedback mode to the other of the NACK feedback mode or the ACK/NACK feedback mode.

In some aspects, the first UE may receive, from the BS, an indication of at least one of a first target received power or a first pathloss compensation for performing a first power control procedure for transmitting the NACK feedback for the first multicast communication. The first UE may also receive, from the BS, and an indication of at least one of a second target received power different from the first target received power or a second pathloss compensation different from the first pathloss compensation for a second power control procedure for transmitting the ACK feedback or the NACK feedback for the second multicast communication.

Figure 11:
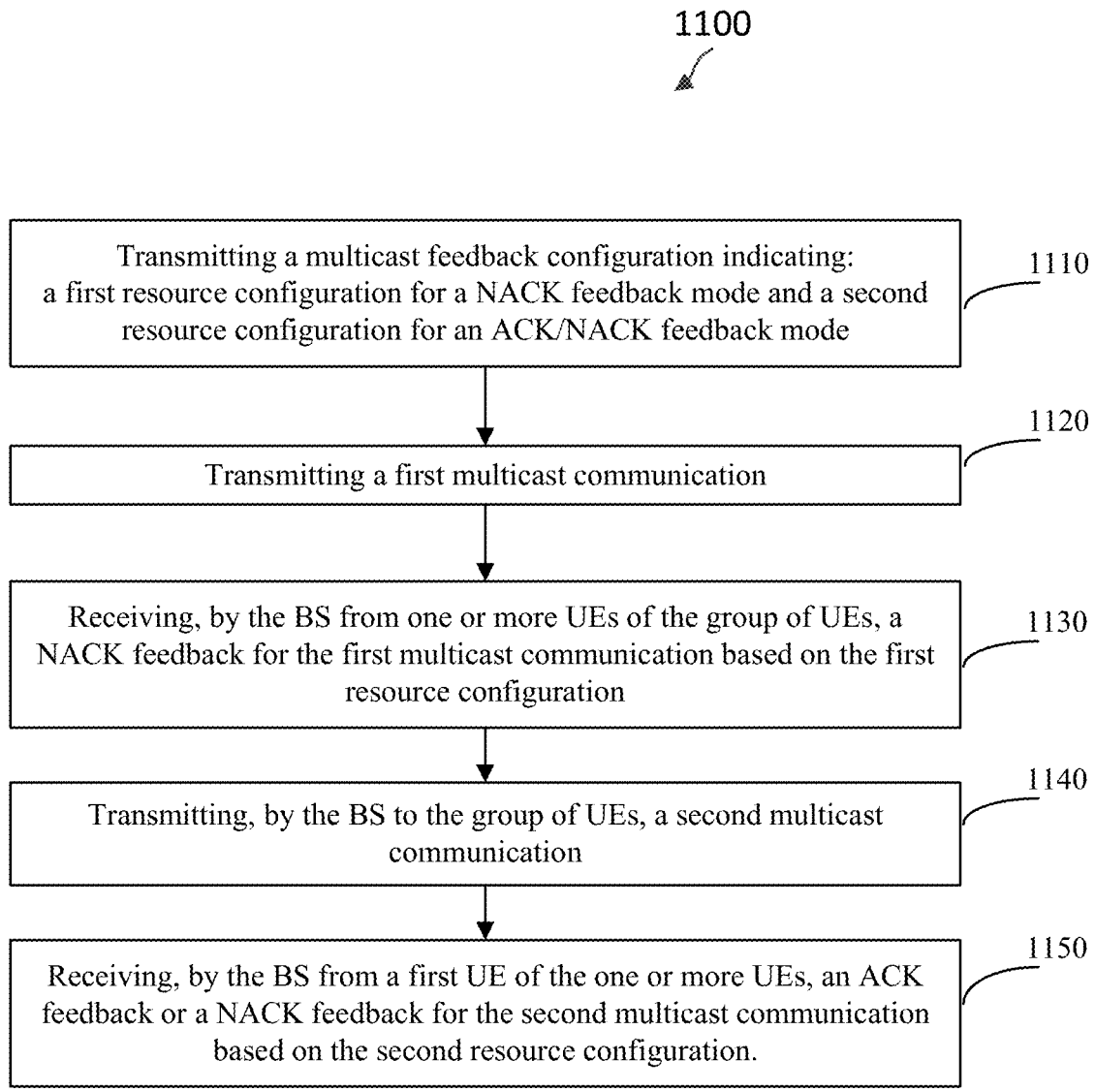
FIG. 11 is a flow diagram of a wireless communication method according to some aspects of the present disclosure.

FIG. 11 is a flow diagram of a wireless communication method 1100 according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as the BSs 105, 305, 605, and/or 800, may utilize one or more components, such as the processor 802, the memory 804, the multicast feedback module 808, the transceiver 810, the modem 812, and the one or more antennas 816, to execute the steps of method 1100. The method 1100 may employ similar mechanisms as in the schemes 300, 400, and 500 discussed above with reference to FIGS. 3, 4, and/or 5, respectively, and/or the method 900 discussed above with reference to FIG. 9. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, a BS (e.g., the BSs 105, 305, 605, and/or 700) transmits a multicast feedback configuration indicating a first resource configuration for a NACK feedback mode (e.g., the NACK-only feedback mode 304) and a second resource configuration for an ACK/NACK feedback mode (e.g., the ACK/NACK feedback mode 306). In some aspects, the BS may utilize one or more components, such as the processor 802, the memory 804, the multicast feedback module 808, the transceiver 810, the modem 812, and the one or more antennas 816, to transmit the multicast feedback configuration.

In some aspects, the first resource configuration may be a common NACK resource configuration among the group of UEs and the second resource configuration may be a UE-specific ACK/NACK resource configuration designated to the first UE. In some aspects, the first resource configuration may include at least one of a different time configuration, a different frequency configuration, or a different sequence configuration than the second resource configuration, for example, as shown in the scheme 400 discussed above with reference to FIG. 4. In some aspects, the BS may transmit the first resource configuration for the NACK feedback mode via SIB signaling and may transmit the second resource configuration for the ACK/NACK feedback mode via UE-specific signaling (e.g., a RRC configuration).

At block 1120, the BS transmits, to a group of UEs (e.g., the UEs. 115, 315, 615, and/or 700), a first multicast communication. In some aspects, the BS may utilize one or more components, such as the processor 802, the memory 804, the multicast feedback module 808, the transceiver 810, the modem 812, and the one or more antennas 816, to transmit the first multicast communication.

At block 1130, the BS receives, from one or more UEs of the group of UEs, a NACK feedback for the first multicast communication based on the first resource configuration. In some aspects, the BS may utilize one or more components, such as the processor 802, the memory 804, the multicast feedback module 808, the transceiver 810, the modem 812, and the one or more antennas 816, to receive the NACK feedback for the first multicast communication based on the first resource configuration.

At block 1140, the BS transmits, to the group of UEs, a second multicast communication. In some aspects, the BS may utilize one or more components, such as the processor 802, the memory 804, the multicast feedback module 808, the transceiver 810, the modem 812, and the one or more antennas 816, to transmit the second multicast communication.

At block 1150, the BS receives, from a first UE of the one or more UEs, an ACK feedback or a NACK feedback for the second multicast communication based on the second resource configuration. In some aspects, the BS may utilize one or more components, such as the processor 802, the memory 804, the multicast feedback module 808, the transceiver 810, the modem 812, and the one or more antennas 816, to receive the NACK feedback or the ACK feedback for the second multicast communication based on the first resource configuration.

In some aspects, the BS may also transmit, to the first UE, an instruction to switch from one of the NACK feedback mode or the ACK/NACK feedback mode to the other of the NACK feedback mode or the ACK/NACK feedback mode, for example, via RRC signaling or DCI signaling. The receiving the NACK feedback for the first multicast communication at block 1130 may be in response to transmitting the instruction to switch from the ACK/NACK feedback mode to the NACK feedback mode. The receiving the ACK feedback or the NACK feedback for the second multicast communication at block 1150 may be in response to transmitting the instruction to switch from the NACK feedback mode to the ACK/NACK feedback mode.

In some aspects, the first resource configuration and the second resource configuration include a same frequency configuration and a same time configuration, for example, as shown in the scheme 500 discussed above with reference to FIG. 5. The multicast feedback configuration may further indicate a rule for selecting between the NACK feedback mode or the ACK/NACK feedback mode. In some aspects, the BS may further transmit a scheduling grant for the first multicast communication, where the scheduling grant may include a first spreading code for the NACK feedback mode and a second spreading code for the ACK/NACK feedback mode and the second spreading code may be different from the first spreading code. The BS may further monitor, in a resource indicated by the frequency configuration and the time configuration, for a feedback for the first multicast communication based on the first spreading code and the second spreading code. The BS may receive the NACK feedback for the first multicast communication at the block 1130 further based on the monitoring. In some aspects, the BS may further transmit a scheduling grant for the second multicast communication, where the scheduling grant may include a first spreading code for the NACK feedback mode and a second spreading code for the ACK/NACK feedback mode and the second spreading code may be different from the first spreading code. The BS may further monitor, in a resource indicated by the frequency configuration and the time configuration, for a feedback for the second multicast communication based on the first spreading code and the second spreading code. The BS may receive the ACK feedback or the NACK feedback for the second multicast communication at the block 1150 further based on the monitoring. In some aspects, the rule can be based on a pathloss, a SINR, a CQI, a RSRP, and/or a decoding status.

In some aspects, the multicast feedback configuration may indicate a periodicity for switching from the one of the NACK feedback mode or the ACK/NACK feedback mode to the other of the NACK feedback mode or the ACK/NACK feedback mode. The receiving the NACK feedback for the first multicast communication or the receiving the ACK feedback or the NACK feedback for the second multicast communication may be based on the periodicity. In some aspects, the multicast feedback configuration may restrict the switching from the one of the NACK feedback mode or the ACK/NACK feedback mode to the other of the NACK feedback mode or the ACK/NACK feedback mode within the periodicity.

In some aspects, the BS may also transmit an indication of at least one of a first target received power or a first pathloss compensation for a first power control of the transmitting the NACK feedback for the first multicast communication. The BS may also transmit an indication of at least one of a second target received power different from the first target received power or a second pathloss compensation different from the first pathloss compensation for a second power control of the transmitting the ACK feedback or the NACK feedback for the second multicast communication.

Further aspects of the present disclosure are provided below.

Aspect 1 includes a method of wireless communication, comprising receiving, by a first user equipment (UE) from a base station (BS), a multicast feedback configuration indicating: a first resource configuration for a negative-acknowledgement (NACK) feedback mode; and a second resource configuration for an acknowledgement/negative-acknowledgement (ACK/NACK) feedback mode; receiving, by the first UE from the BS, a first multicast communication; transmitting, by the first UE to the BS, a NACK feedback for the first multicast communication based on the first resource configuration; receiving, by the first UE from the BS, a second multicast communication; and transmitting, by the first UE to the BS, an ACK feedback or a NACK feedback for the second multicast communication based on the second resource configuration.

Aspect 2 includes the method of aspect 1, wherein the first resource configuration is a common NACK resource configuration among a group of UEs including the first UE, and wherein the second resource configuration is a UE-specific ACK/NACK resource configuration designated to the first UE.

Aspect 3 includes the method of any of aspects 1-2, wherein the first resource configuration includes at least one of a different time configuration, a different frequency configuration, or a different sequence configuration than the second resource configuration.

Aspect 4 includes the method of any of aspects 1-3, further comprising receiving, by the first UE from the BS, an instruction to switch from one of the NACK feedback mode or the ACK/NACK feedback mode to the other of the NACK feedback mode or the ACK/NACK feedback mode.

Aspect 5 includes the method of any of aspects 1-4, wherein the transmitting the NACK feedback for the first multicast communication is in response to receiving the instruction to switch from the ACK/NACK feedback mode to the NACK feedback mode.

Aspect 6 includes the method of any of aspects 1-4, wherein the transmitting the ACK feedback or the NACK feedback for the second multicast communication is in response to receiving the instruction to switch from the NACK feedback mode to the ACK/NACK feedback mode.

Aspect 7 includes the method of aspect of any of aspects 1-6, wherein the receiving the instruction to switch from the one of the NACK feedback mode or the ACK/NACK feedback mode to the other of the NACK feedback mode or the ACK/NACK feedback mode includes receiving, by the first UE from the BS, the instruction via at least one of radio resource configuration control (RRC) signaling or downlink control information (DCI) signaling.

Aspect 8 includes the method of any of aspects 1-7, wherein the first resource configuration and the second resource configuration include a same frequency configuration and a same time configuration, and wherein the multicast feedback configuration further indicates a rule for selecting between the NACK feedback mode or the ACK/NACK feedback mode.

Aspect 9 incudes the method of any of aspects 1-8, further comprising receiving, by the first UE from the BS, a scheduling grant for the first multicast communication, the scheduling grant including a first spreading code for the NACK feedback mode and a second spread code for the ACK/NACK feedback mode, the second spreading code being different from the first spreading code; and selecting, by the first UE, the first spreading code based on the rule, wherein the transmitting the NACK feedback for the first multicast communication is further based on the selected first spreading code.

Aspect 10 includes the method of any of aspects 1-9, further comprising receiving, by the first UE from the BS, a scheduling grant for the second multicast communication, the scheduling grant including a first spreading code for the NACK feedback mode and a second spread code for the ACK/NACK feedback mode, the second spreading code being different from the first spreading code; and selecting, by the first UE, the second spreading code based on rule, wherein the transmitting the ACK feedback or the NACK feedback for the second multicast communication is further based on the selected second spreading code.

Aspect 11 includes the method any of aspects 1-8, wherein the rule for switching from the one of the NACK feedback mode or the ACK/NACK feedback mode to the other of the NACK feedback mode or the ACK/NACK feedback mode is based on a channel measurement.

Aspect 12 includes the method of any of aspects 1-11, wherein the channel measurement includes at least one of a pathloss, a reference signal received power (RSRP), a signal-to-interference-plus-noise ratio (SINR), or a channel quality indicator (CQI).

Aspect 13 includes the method of any of aspects 1-8, wherein the rule for switching from the one of the NACK feedback mode or the ACK/NACK feedback mode to the other of the NACK feedback mode or the ACK/NACK feedback mode is based on a DL decoding status.

Aspect 14 includes the method of any of aspects 1-8, wherein the multicast feedback configuration indicates a periodicity for switching from the one of the NACK feedback mode or the ACK/NACK feedback mode to the other of the NACK feedback mode or the ACK/NACK feedback mode.

Aspect 15 includes the method of any of aspects 1-8 or 14, wherein the transmitting the NACK feedback for the first multicast communication is based on the periodicity; or the transmitting the ACK feedback or the NACK feedback for the second multicast communication is based on the periodicity.

Aspect 16 includes the method of any of aspects 1-8 or 14-15, wherein the multicast feedback configuration restricts the switching from the one of the NACK feedback mode or the ACK/NACK feedback mode to the other of the NACK feedback mode or the ACK/NACK feedback mode within the periodicity.

Aspect 17 includes the method of any of aspects 1-3, further comprising transmitting, by the first UE to the BS, a request to switch from one of the NACK feedback mode or the ACK/NACK feedback mode to the other of the NACK feedback mode or the ACK/NACK feedback mode.

Aspect 18 includes the method of any of aspects 1-3, wherein the transmitting the NACK feedback for the first multicast communication is based on a first power control procedure, and wherein the transmitting the ACK feedback or the NACK feedback for the second multicast communication is based on a second power control procedure different from the first power control procedure.

Aspect 19 includes the method of any of aspects 1-3 or 18, further comprising receiving, by the first UE from the BS, an indication of at least one of a first target received power or a first pathloss compensation for the first power control procedure; and receiving, by the first UE from the BS, an indication of at least one of a second target received power different from the first target received power or a second pathloss compensation different from the first pathloss compensation for the second power control procedure.

Aspect 20 includes the method of any of aspects 1-19, wherein the receiving the multicast feedback configuration includes receiving, by the first UE from the BS, the first resource configuration for the NACK feedback mode via system information block (SIB) signaling; and receiving, by the first UE from the BS, the second resource configuration for the ACK/NACK feedback mode via UE-specific signaling.

Aspect 21 includes a method of wireless communication, comprising transmitting, by a base station (BS), a multicast feedback configuration indicating a first resource configuration for a negative-acknowledgement (NACK) feedback mode; and a second resource configuration for an acknowledgement/negative-acknowledgement (ACK/NACK) feedback mode; transmitting, by the BS to a group of user equipments (UEs), a first multicast communication; receiving, by the BS from one or more UEs of the group of UEs, a NACK feedback for the first multicast communication based on the first resource configuration; transmitting, by the BS to the group of UEs, a second multicast communication; and receiving, by the BS from a first UE of the one or more UEs, an ACK feedback or a NACK feedback for the second multicast communication based on the second resource configuration.

Aspect 22 includes the method of aspect 21, wherein the first resource configuration is a common NACK resource configuration among the group of UEs, and wherein the second resource configuration is a UE-specific ACK/NACK resource configuration designated to the first UE.

Aspect 23 includes the method of any of aspects 21-22, wherein the first resource configuration includes at least one of a different time configuration, a different frequency configuration, or a different sequence configuration than the second resource configuration.

Aspect 24 includes the method of any of aspects 21-23, further comprising transmitting, by the BS to the first UE, an instruction to switch from one of the NACK feedback mode or the ACK/NACK feedback mode to the other of the NACK feedback mode or the ACK/NACK feedback mode.

Aspect 25 includes the method of any of aspects 21-24, wherein the receiving the NACK feedback for the first multicast communication is in response to transmitting the instruction to switch from the ACK/NACK feedback mode to the NACK feedback mode.

Aspect 26 includes the method of any of aspects 21-24, wherein the receiving the ACK feedback or the NACK feedback for the second multicast communication is in response to transmitting the instruction to switch from the NACK feedback mode to the ACK/NACK feedback mode.

Aspect 27 includes the method of any of aspects 21-26, wherein the transmitting the instruction to switch from the one of the NACK feedback mode or the ACK/NACK feedback mode to the other of the NACK feedback mode or the ACK/NACK feedback mode includes transmitting, by the BS, the instruction via at least one of radio resource configuration control (RRC) signaling or downlink control information (DCI) signaling.

Aspect 28 includes the method of any of aspects 21-27, wherein the first resource configuration and the second resource configuration include a same frequency configuration and a same time configuration, and wherein the multicast feedback configuration further indicates a rule for selecting between the NACK feedback mode or the ACK/NACK feedback mode.

Aspect 29 includes the method of any of aspects 21-28, further comprising transmitting, by the BS, a scheduling grant for the first multicast communication, the scheduling grant including a first spreading code for the NACK feedback mode and a second spreading code for the ACK/NACK feedback mode, the second spreading code being different from the first spreading code; and monitoring, by the BS in a resource indicated by the frequency configuration and the time configuration, for a feedback for the first multicast communication based on the first spreading code and the second spreading code, wherein the receiving the NACK feedback for the first multicast communication is further based on the monitoring.

Aspect 30 includes the method of any of aspects 21-29, further comprising transmitting, by the BS, a scheduling grant for the second multicast communication, the scheduling grant including a first spreading code for the NACK feedback mode and a second spreading code for the ACK/NACK feedback mode, the second spreading code being different from the first spreading code; and monitoring, by the BS in a resource indicated by the frequency configuration and the time configuration, for a feedback for the second multicast communication based on the first spreading code and the second spreading code, the receiving the ACK feedback or the NACK feedback for the second multicast communication is further based on the monitoring.

Aspect 31 includes the method of any of aspects 21-28, wherein the rule for switching from the one of the NACK feedback mode or the ACK/NACK feedback mode to the other of the NACK feedback mode or the ACK/NACK feedback mode is based on a channel measurement.

Aspect 32 includes the method of any of aspects 21-31, wherein the channel measurement includes at least one of a pathloss, a reference signal received power (RSRP), a signal-to-interference-plus-noise ratio (SINR), or a channel quality indicator (CQI).

Aspect 33 includes the method of any of aspects 21-28 wherein the rule for switching from the one of the NACK feedback mode or the ACK/NACK feedback mode to the other of the NACK feedback mode or the ACK/NACK feedback mode is based on a DL decoding status.

Aspect 34 includes the method of any of aspects 21-28, wherein the multicast feedback configuration indicates a periodicity for switching from the one of the NACK feedback mode or the ACK/NACK feedback mode to the other of the NACK feedback mode or the ACK/NACK feedback mode.

Aspect 35 includes the method of any of aspects 21-28 or 34, wherein the receiving the NACK feedback for the first multicast communication is based on the periodicity; or the receiving the ACK feedback or the NACK feedback for the second multicast communication is based on the periodicity.

Aspect 36 includes the method of any of aspects 21-28 or 34-35, wherein the multicast feedback configuration restricts the switching from the one of the NACK feedback mode or the ACK/NACK feedback mode to the other of the NACK feedback mode or the ACK/NACK feedback mode within the periodicity.

Aspect 37 includes the method of any of aspects 21-23, further comprising receiving, by the BS from the first UE, a request to switch from one of the NACK feedback mode or the ACK/NACK feedback mode to the other of the NACK feedback mode or the ACK/NACK feedback mode.

Aspect 38 includes the method of any of aspects 21-23, further comprising transmitting, by the BS, an indication of at least one of a first target received power or a first pathloss compensation for a first power control of the transmitting the NACK feedback for the first multicast communication; and transmitting, by the BS, an indication of at least one of a second target received power different from the first target received power or a second pathloss compensation different from the first pathloss compensation for a second power control of the transmitting the ACK feedback or the NACK feedback for the second multicast communication.

Aspect 39 includes the method of any of aspects 21-28, wherein the transmitting the multicast feedback configuration includes transmitting, by the BS, the first resource configuration for the NACK feedback mode via system information block (SIB) signaling; and transmitting, by the BS to the first UE, the second resource configuration for the ACK/NACK feedback mode via UE-specific signaling.

Aspect 40 includes an apparatus comprising a processor coupled to a transceiver, wherein the processor and the transceiver are configured to perform the method of any one of aspects 1-20. The processor and the transceiver may correspond to the processor 702 and the transceiver 710 of FIG. 7, respectively.

Aspect 41 includes an apparatus comprising a processor coupled to a transceiver, wherein the processor and the transceiver are configured to perform the method of any one of aspects 21-39. The processor and the transceiver may correspond to the processor 802 and the transceiver 810 of FIG. 8, respectively.

Aspect 42 includes an apparatus comprising means for performing the method of any one of aspects 1-20. The means may include components, such as the processor 702, the memory 704, the multicast feedback module 708, the transceiver 710, the modem 712, and the one or more antennas 716 of FIG. 7.

Aspect 43 includes an apparatus comprising means for performing the method of any one of aspects 21-39. The means may include components, such as the processor 802, the memory 804, the multicast feedback module 808, the transceiver 810, the modem 812, and the one or more antennas 816 of FIG. 8.

Aspect 44 includes a non-transitory computer readable medium including program code, which when executed by one or more processors, causes a wireless communication device to perform the method of any one of aspects 1-20.

Aspect 45 includes a non-transitory computer readable medium including program code, which when executed by one or more processors, causes a wireless communication device to perform the method of any one of aspects 21-39.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A user equipment (UE), comprising:
   a transceiver configured to:
      receive, from a base station (BS), a multicast feedback configuration indicating:
         a first resource configuration for a negative-acknowledgement (NACK) feedback mode; and
         a second resource configuration for an acknowledgement/negative-acknowledgement (ACK/NACK) feedback mode, wherein the multicast feedback configuration indicates a periodicity for switching from one of the NACK feedback mode or the ACK/NACK feedback mode to another NACK feedback mode or another ACK/NACK feedback mode;
      receive, from the BS, a first multicast communication;
      transmit, to the BS, a NACK feedback for the first multicast communication based on the first resource configuration;
      receive, from the BS, a second multicast communication; and
      transmit, to the BS, an ACK feedback or a NACK feedback for the second multicast communication based on the second resource configuration.

2. The UE of claim 1, wherein the first resource configuration is a common NACK resource configuration among a group of UEs including the UE, and wherein the second resource configuration is a UE-specific ACK/NACK resource configuration designated to the UE.

3. The UE of claim 1, wherein the first resource configuration includes at least one of a different time configuration, a different frequency configuration, or a different sequence configuration than the second resource configuration.

4. The UE of claim 1, wherein the transceiver is further configured to:
   receive, from the BS, an instruction to switch from one of the NACK feedback mode or the ACK/NACK feedback mode to the other of the NACK feedback mode or the ACK/NACK feedback mode.

5. The UE of claim 4, wherein the transceiver configured to transmit the NACK feedback for the first multicast communication is configured to:
   transmit, in response to receiving the instruction to switch from the ACK/NACK feedback mode to the NACK feedback mode, the NACK feedback for the first multicast communication.

6. The UE of claim 4, wherein the transceiver configured to transmit the ACK feedback or the NACK feedback for the second multicast communication is configured to:
   transmit, in response to receiving the instruction to switch from the NACK feedback mode to the ACK/NACK feedback mode, the ACK feedback or the NACK feedback for the second multicast communication.

7. The UE of claim 4, wherein the transceiver is further configured to:
   receive, from the BS, the instruction via at least one of radio resource configuration control (RRC) signaling or downlink control information (DCI) signaling.

8. The UE of claim 1, wherein the first resource configuration and the second resource configuration include a same frequency configuration and a same time configuration, and wherein the multicast feedback configuration further indicates a rule for selecting between the NACK feedback mode or the ACK/NACK feedback mode.

9. The UE of claim 8, wherein the transceiver is further configured to:

receive, from the BS, a scheduling grant for the first multicast communication, the scheduling grant including a first spreading code for the NACK feedback mode and a second spreading code for the ACK/NACK feedback mode, the second spreading code being different from the first spreading code; and transmit the NACK feedback for the first multicast communication is configured to utilize the first spreading code; and transmit the ACK feedback or the NACK feedback for the second multicast communication is configured to utilize the second spreading code.

10. The UE of claim 8, further comprising a processor in communication with the transceiver, the processor configured to select a first spreading code or a second spreading code based on the rule.

11. The UE of claim 8, further comprising a processor in communication with the transceiver, the processor configured to perform a channel measurement, wherein the rule for switching from the one of the NACK feedback mode or the ACK/NACK feedback mode to the other of the NACK feedback mode or the ACK/NACK feedback mode is based on the channel measurement.

12. The UE of claim 11, wherein the processor is further configured to perform the channel measurement by measuring at least one of a pathloss, a reference signal received power (RSRP), a signal-to-interference-plus-noise ratio (SINR), or a channel quality indicator (CQI).

13. The UE of claim 8, further comprising a processor in communication with the transceiver, the processor configured to determine a DL decoding status, wherein the rule for switching from the one of the NACK feedback mode or the ACK/NACK feedback mode to the other of the NACK feedback mode or the ACK/NACK feedback mode is based on the DL decoding status.

14. The UE of claim 1, wherein the transceiver is further configured to:
transmit the NACK feedback for the first multicast communication based on the periodicity; or
transmit the ACK feedback or the NACK feedback for the second multicast communication based on the periodicity.

15. The UE of claim 1, further comprising a processor in communication with the transceiver, the processor configured to restrict, based on the multicast feedback configuration, the switching from the one of the NACK feedback mode or the ACK/NACK feedback mode to another NACK feedback mode or another ACK/NACK feedback mode to within the periodicity.

16. The UE of claim 1, wherein the transceiver is further configured to:
transmit, to the BS, a request to switch from one of the NACK feedback mode or the ACK/NACK feedback mode to the other of the NACK feedback mode or the ACK/NACK feedback mode.

17. The UE of claim 1, wherein the transceiver is further configured to:
transmit the NACK feedback for the first multicast communication is configured based on a first power control procedure; and
transmit the ACK feedback or the NACK feedback for the second multicast communication is configured based on a second power control procedure different from the first power control procedure.

18. The UE of claim 17, wherein the transceiver is further configured to:

receive, from the BS, an indication of at least one of a first target received power or a first pathloss compensation for the first power control procedure; and
receive, from the BS, an indication of at least one of a second target received power different from the first target received power or a second pathloss compensation different from the first pathloss compensation for the second power control procedure.

19. The UE of claim 1, wherein the transceiver is further configured to:
receive, from the BS, the first resource configuration for the NACK feedback mode via system information block (SIB) signaling; and
receive, from the BS, the second resource configuration for the ACK/NACK feedback mode via UE-specific signaling.

20. A method of wireless communication, comprising:
receiving, by a first user equipment (UE) from a base station (BS), a multicast feedback configuration indicating:
a first resource configuration for a negative-acknowledgement (NACK) feedback mode; and
a second resource configuration for an acknowledgement/negative-acknowledgement (ACK/NACK) feedback mode, wherein the multicast feedback configuration indicates a periodicity for switching from one of the NACK feedback mode or the ACK/NACK feedback mode to another NACK feedback mode or another ACK/NACK feedback mode;
receiving, by the first UE from the BS, a first multicast communication;
transmitting, by the first UE to the BS, a NACK feedback for the first multicast communication based on the first resource configuration;
receiving, by the first UE from the BS, a second multicast communication; and
transmitting, by the first UE to the BS, an ACK feedback or a NACK feedback for the second multicast communication based on the second resource configuration.

21. The method of claim 20, wherein the first resource configuration is a common NACK resource configuration among a group of UEs including the first UE, and wherein the second resource configuration is a UE-specific ACK/NACK resource configuration designated to the first UE.

22. The method of claim 20, wherein the first resource configuration includes at least one of a different time configuration, a different frequency configuration, or a different sequence configuration than the second resource configuration.

23. The method of claim 20, further comprising:
receiving, by the first UE from the BS, an instruction to switch from one of the NACK feedback mode or the ACK/NACK feedback mode to the other of the NACK feedback mode or the ACK/NACK feedback mode.

24. The method of claim 20, wherein the first resource configuration and the second resource configuration include a same frequency configuration and a same time configuration, and wherein the multicast feedback configuration further indicates a rule for selecting between the NACK feedback mode or the ACK/NACK feedback mode.

25. The method of claim 20, further comprising:
transmitting, by the first UE to the BS, a request to switch from one of the NACK feedback mode or the ACK/NACK feedback mode to the other of the NACK feedback mode or the ACK/NACK feedback mode.

26. The method of claim 20, wherein the transmitting the NACK feedback for the first multicast communication is based on a first power control procedure, and wherein the transmitting the ACK feedback or the NACK feedback for the second multicast communication is based on a second power control procedure different from the first power control procedure.

27. The method of claim 20, wherein the receiving the multicast feedback configuration includes:
receiving, by the first UE from the BS, the first resource configuration for the NACK feedback mode via system information block (SIB) signaling; and
receiving, by the first UE from the BS, the second resource configuration for the ACK/NACK feedback mode via UE-specific signaling.

28. A user equipment (UE), comprising:
means for receiving, from a base station (BS), a multicast feedback configuration indicating:
a first resource configuration for a negative-acknowledgement (NACK) feedback mode; and
a second resource configuration for an acknowledgement/negative-acknowledgement (ACK/NACK) feedback mode, wherein the multicast feedback configuration indicates a periodicity for switching from one of the NACK feedback mode or the ACK/NACK feedback mode to another NACK feedback mode or another ACK/NACK feedback mode;
means for receiving, from the BS, a first multicast communication;
means for transmitting, to the BS, a NACK feedback for the first multicast communication based on the first resource configuration;
means for receiving, from the BS, a second multicast communication; and
means for transmitting, to the BS, an ACK feedback or a NACK feedback for the second multicast communication based on the second resource configuration.

29. A non-transitory computer-readable medium having program code recorded thereon, the program code comprising:
code for causing a user equipment (UE) to receive, from a base station (BS), a multicast feedback configuration indicating:
a first resource configuration for a negative-acknowledgement (NACK) feedback mode; and
a second resource configuration for an acknowledgement/negative-acknowledgement (ACK/NACK) feedback mode, wherein the multicast feedback configuration indicates a periodicity for switching from one of the NACK feedback mode or the ACK/NACK feedback mode to another NACK feedback mode or another ACK/NACK feedback mode;
code for causing the UE to receive, from the BS, a first multicast communication;
code for causing the UE to transmit, to the BS, a NACK feedback for the first multicast communication based on the first resource configuration;
code for causing the UE to receive, from the BS, a second multicast communication; and
code for causing the UE to transmit, to the BS, an ACK feedback or a NACK feedback for the second multicast communication based on the second resource configuration.

\* \* \* \* \*